US012639056B2

(12) United States Patent
Kim

(10) Patent No.: US 12,639,056 B2
(45) Date of Patent: May 26, 2026

(54) ADAPTIVE SEARCH-BASED ALLOCATION OF COMPUTATIONS TO SYNCHRONIZED, INTERCONNECTED PROCESSING ELEMENTS FOR IMPLEMENTING MACHINE LEARNING NETWORKS

(71) Applicant: SiMa Technologies, Inc., San Jose, CA (US)

(72) Inventor: Gwangho Kim, San Jose, CA (US)

(73) Assignee: SiMa Technologies, Inc., San Jose, CA (US)

( * ) Notice: Subject to any disclaimer, the term of this patent is extended or adjusted under 35 U.S.C. 154(b) by 317 days.

(21) Appl. No.: 18/479,770

(22) Filed: Oct. 2, 2023

(65) Prior Publication Data

US 2025/0110717 A1 Apr. 3, 2025

(51) Int. Cl.
G06F 8/41 (2018.01)
G06F 9/50 (2006.01)
(Continued)

(52) U.S. Cl.
CPC ............ G06F 8/453 (2013.01); G06F 9/5027 (2013.01); G06F 9/5066 (2013.01);
(Continued)

(58) Field of Classification Search
CPC . G06F 8/41; G06F 8/443; G06F 8/453; G06F 9/54; G06F 9/5027; G06F 9/5066; G06F 9/5072; G06N 3/063; G06N 3/105
See application file for complete search history.

(56) References Cited

U.S. PATENT DOCUMENTS 9,928,460 B1 3/2018 Nowatzyk et al.
11,586,894 B2 2/2023 Kotler et al.
(Continued)

FOREIGN PATENT DOCUMENTS

WO WO-2022260656 A1 * 12/2022 ........... G06F 9/5038

OTHER PUBLICATIONS

Sousa, Rafael, et al., Efficient Tensor Slicing for Multicore NPUs using Memory Burst Modeling, IEEE 33rd International Symposium on Computer Architecture and High Performance Computing (SBAC-PAD), Oct. 2021, 10 pages, [retrieved on Oct. 8, 2025], Retrieved from the Internet: <URL:http://ieeexplore.ieee.org/>.*
(Continued)

*Primary Examiner* — Geoffrey R St Leger
(74) *Attorney, Agent, or Firm* — Fenwick & West LLP

(57) ABSTRACT

A system for compiling a machine learning network for execution on a plurality of interconnected processing elements performs the following. It selects splits $(P_s,Q_s,K_s)$ for individual layers of the machine learning network based on (a) costs of data transfer between processing elements assuming that inputs and outputs of individual layers have a same spatial split $(P_s,Q_s)$, and (b) costs of data transfer between processing elements resulting from differences in the spatial splits for inputs and outputs of individual layers. In addition, it selects the same splits $(P_s,Q_s,K_s)$ for layers that have the same spatial size $P{\times}Q$. It then generates a computer program that allocates computations for executing the machine learning network to the processing elements according to the selected splits for the individual layers.

20 Claims, 20 Drawing Sheets

(51) Int. Cl.

| | |
|---|---|
| *G06F 9/54* | (2006.01) |
| *G06N 3/063* | (2023.01) |
| *G06N 3/10* | (2006.01) |

(52) U.S. Cl.
CPC .............. *G06F 9/5072* (2013.01); *G06F 9/54* (2013.01); *G06N 3/063* (2013.01); *G06N 3/105* (2013.01)

(56) References Cited

U.S. PATENT DOCUMENTS

| | | | |
|---|---|---|---|
| 11,734,605 B2 | 8/2023 | Kotler et al. | |
| 11,803,740 B2 | 10/2023 | Kotler et al. | |
| 11,886,981 B2 | 1/2024 | Shah et al. | |
| 12,373,257 B2 * | 7/2025 | Bokam | G06F 18/29 |
| 2001/0029520 A1 | 10/2001 | Miyazaki et al. | |
| 2005/0257194 A1 | 11/2005 | Morrow et al. | |
| 2013/0297370 A1 | 11/2013 | Pegden | |
| 2016/0379686 A1 | 12/2016 | Burger et al. | |
| 2017/0103299 A1 | 4/2017 | Aydonat et al. | |
| 2017/0178386 A1 | 6/2017 | Redshaw et al. | |
| 2018/0322386 A1 | 11/2018 | Sridharan et al. | |
| 2019/0004878 A1 | 1/2019 | Adler et al. | |
| 2019/0018815 A1 | 1/2019 | Fleming et al. | |
| 2019/0076031 A1 | 3/2019 | Valys et al. | |
| 2019/0114548 A1 | 4/2019 | Wu et al. | |
| 2019/0155768 A1 | 5/2019 | Wilkinson et al. | |
| 2019/0205737 A1 | 7/2019 | Bleiweiss et al. | |
| 2019/0286973 A1 | 9/2019 | Kovvuri et al. | |
| 2019/0303346 A1 | 10/2019 | Brewer | |
| 2019/0370346 A1 * | 12/2019 | Xu | G06F 16/2237 |
| 2019/0391796 A1 | 12/2019 | Brady et al. | |
| 2020/0007342 A1 | 1/2020 | Liem et al. | |
| 2020/0012536 A1 | 1/2020 | Lacey et al. | |
| 2020/0012537 A1 | 1/2020 | Lacey et al. | |
| 2020/0065671 A1 | 2/2020 | Sahni et al. | |
| 2020/0073830 A1 | 3/2020 | Verrilli et al. | |
| 2020/0090383 A1 | 3/2020 | Dwivedi | |
| 2020/0117978 A1 | 4/2020 | Chen et al. | |
| 2020/0133914 A1 | 4/2020 | Wilkinson et al. | |
| 2020/0150713 A1 | 5/2020 | Knowles et al. | |
| 2020/0272892 A1 | 8/2020 | Desappan et al. | |
| 2020/0320403 A1 | 10/2020 | Daga et al. | |
| 2021/0174137 A1 | 6/2021 | Kim et al. | |
| 2021/0191765 A1 | 6/2021 | Bokam et al. | |
| 2021/0197967 A1 | 7/2021 | Song et al. | |
| 2021/0201526 A1 | 7/2021 | Moloney et al. | |
| 2021/0240524 A1 | 8/2021 | Gangani et al. | |
| 2021/0278810 A1 | 9/2021 | Heesche et al. | |
| 2021/0326189 A1 | 10/2021 | Shah et al. | |
| 2021/0342672 A1 | 11/2021 | Bohnstingl et al. | |
| 2021/0342673 A1 | 11/2021 | Shah et al. | |
| 2022/0044153 A1 | 2/2022 | Madar, III et al. | |
| 2022/0147826 A1 | 5/2022 | Xiao et al. | |
| 2022/0244984 A1 | 8/2022 | Lee et al. | |
| 2023/0315410 A1 * | 10/2023 | Yang | G06F 8/443 717/151 |

OTHER PUBLICATIONS

Sousa, Rafael, et al., Tensor slicing and optimization for multicore NPUs, Journal of Parallel and Distributed Computing, May 2023,
14 pages, [retrieved on Oct. 9, 2025], Retrieved from the Internet: <URL:https://www.sciencedirect.com/science/article/pii/S0743731522002532>.*

Andri et al., "YodaNN: An Architecture for Ultralow Power Binary-Weight CNN Acceleration", IEEE Transactions on Computer-Aided Design of Integrated Circuits and Systems, vol. 37, No. 1, Jan. 2018, pp. 48-60.

Ankit et al., "PUMA: A Programmable Ultra-efficient Memristor-based Accelerator for Machine Learning Inference", ASPLOS'19, Apr. 13-17, 2019, Providence, RI, USA, pp. 715-731.

Chen, Y. et al., "A Survey of Accelerator Architectures for Deep Neural Networks," Engineering, vol. 6, Jan. 29, 2020, pp. 264-274.

Du et al., "ShiDianNao: Shifting Vision Processing Closer to the Sensor", ISCA'15, Jun. 13-17, 2015, Portland, OR, USA, pp. 92-104.

Everson et al., "A 104.8TOPS/W One-Shot Time-Based Neuromorphic Chip Employing Dynamic Threshold Error Correction in 65nm", IEEE Asian Solid-Slate Circuits Conference Nov. 5-7, 2018/Tainan, Taiwan, pp. 273-276.

Guha, A. et al., "Deepframe: A Profile-Driven Compiler for Spatial Hardware Accelerators," 2019 28th International Conference on Parallel Architectures and Compilation Techniques (PACT), Sep. 23-26, 2019, pp. 68-81.

Jiao et al., "A 12nm Programmable Convolution-Efficient Neural-Processing-Unit Chip Achieving 825TOPS", ISSCC 2020, Session 7, Feb. 18, 2020, 5 pages.

Khaleghi, B. et al., "PatterNet: Explore and Exploit Filter Patterns for Efficient Deep Neural Networks," DAC '22, Jul. 2022, pp. 223-228.

Lee, J. et al., "On-Device Neural Net Inference with Mobile GPUs," arXiv:1907.01989, Jul. 3, 2019, pp. 1-9.

Patent Cooperation Treaty, International Search Report and Written Opinion, PCT Patent Application No. PCT/US2021/027998, Aug. 25, 2021, 22 pages.

Patent Cooperation Treaty International Search Report and Written Opinion, PCT Patent Application No. PCT/US2024/011667, Jun. 21, 2024, 21 pages.

Patent Cooperation Treat, Invitation to Pay Additional Fees, PCT Patent Application No. PCT/US2024/011667, Apr. 5, 2024, two pages.

Reuther et al., "Survey and Benchmarking of Machine Learning Accelerators", 2019 IEEE High Performance Extreme Computing Conference (HPEC) Sep. 24-26, 2019, pp. 1-9.

Shawahna et al., "FPGA-Based Accelerators of Deep Learning Networks for Learning and Classification:", IEEE Access, vol. 7, 2019, pp. 7823-7858.

Sousa, R. et al., "Efficient Tensor Slicing for Multicore NPUs using Memory Burst Modeling," 2021 IEEE 33$^{rd}$ International Symposium on Computer Architecture and High-Performance Computing (SBAC-PAD), Oct. 2021, pp. 84-93.

United States Office Action, U.S. Appl. No. 16/862,515, dated Aug. 17, 2022, 30 pages.

United States Office Action, U.S. Appl. No. 16/865,226, dated Jan. 13, 2023, 14 pages.

United States Office Action, U.S. Appl. No. 16/865,226, dated Jul. 14, 2022, 12 pages.

United States Office Action, U.S. Appl. No. 18/158,447, dated Sep. 5, 2024, 19 pages.

United States Office Action, U.S. Appl. No. 18/107,417, dated Jun. 28, 2023, 8 pages.

* cited by examiner

110
Machine learning
network

120
Determine splits for
individual layers

125
Splits

130
Allocate slices to PEs,
based on splits

140
Generate instructions to
implement MLN, based
on slice-to-PE allocations

190
Computer program 234
232

230
split=(4,4,1)

235 Input-to-IFM k=0

242

240
Output tensor
split=(4,4,1)

k=0 k=2

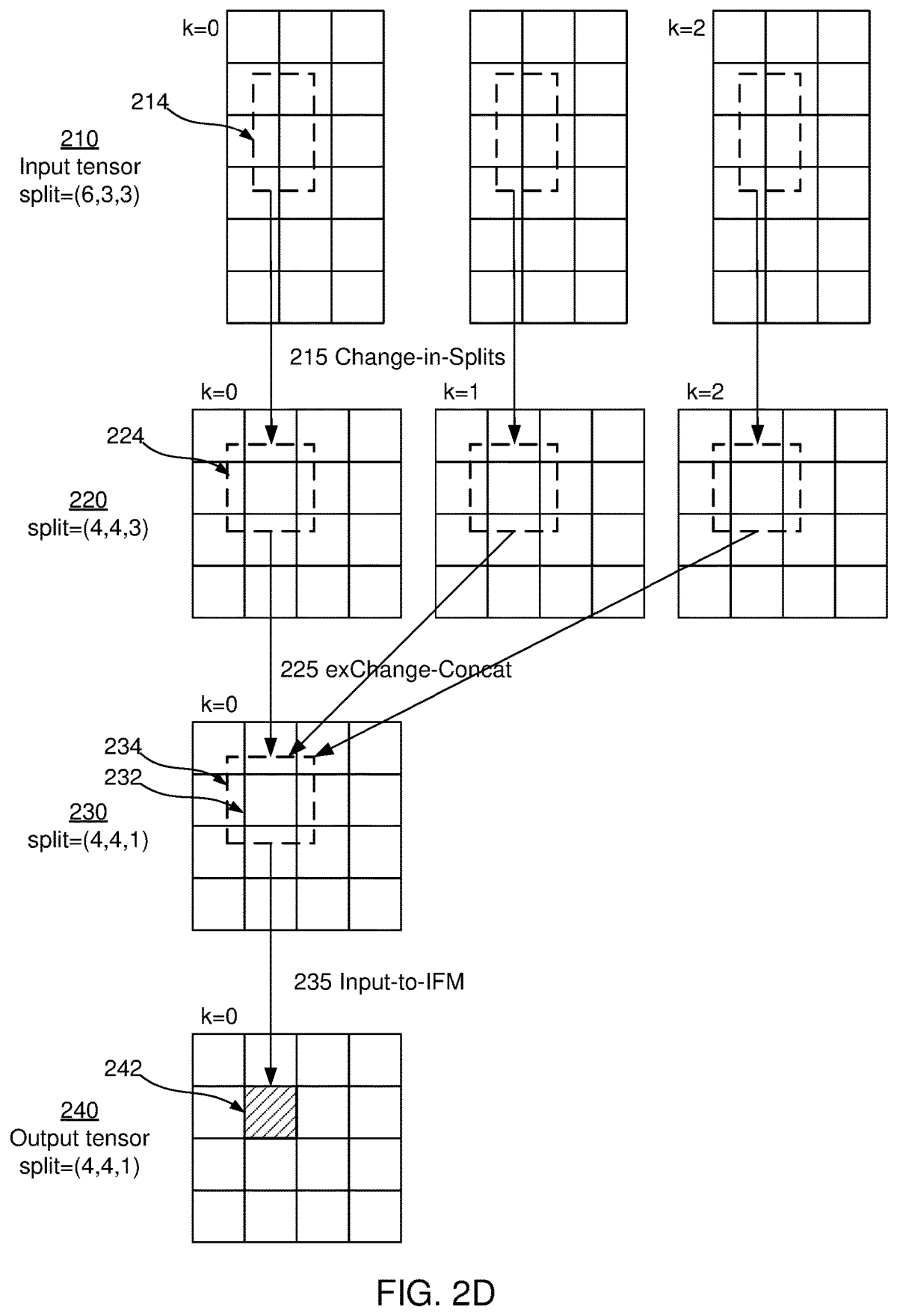

214

210
Input tensor
split=(6,3,3)

215 Change-in-Splits k=0 k=1 k=2

224

220
split=(4,4,3)

225 exChange-Concat k=0

234

232

230
split=(4,4,1)

235 Input-to-IFM k=0

242

240
Output tensor
split=(4,4,1)

FIG. 2D

Tensor 500

PE physical
layout 540

Tensor 500

PE physical layout 540

Tensor 600

| | | | |
|---|---|---|---|
| 1.03 | 1.13 | 1.23 | 1.33 |
| 1.02 | 0.03 | 0.13 | 0.23 | 0.33 |
| 1.01 | 0.02 | 0.12 | 0.22 | 0.32 |
| 1.00 | 0.01 | 0.11 | 0.21 | 0.31 |
| | 0.00 | 0.10 | 0.20 | 0.30 |

FIG. 6A input

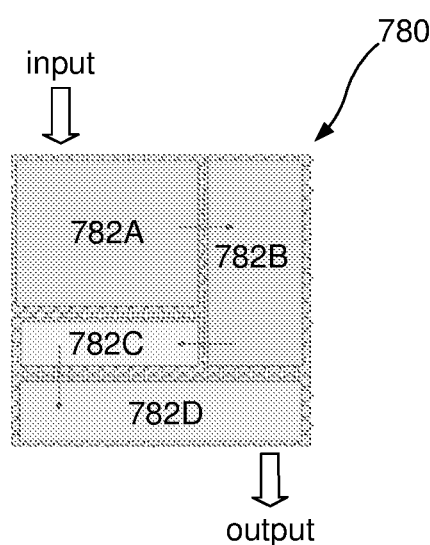

702A

702B

702C

702D output

700 Machine Learning Network
- Architecture (layers, nodes, interconnections, operators applied at nodes)
- Parameters (values of weights, biases, parameters for operators)

720 ML Compiler
- Instruction set
- Known execution duration of instructions
- Known MLA topology 750 Computer Program
- Instructions implement MLN on MLA
- Allocation of computations to Tiles
- Groups of Tile instructions are statically scheduled.

770 Machine Learning Accelerator (MLA)
- Mesh(es) of Tiles + on-chip memory
- Tiles execute instructions
- Data transfer paths between Tiles, and between Tiles and memory input

780

782A

782B

782C

782D output

FIG. 7A

ADAPTIVE SEARCH-BASED ALLOCATION OF COMPUTATIONS TO SYNCHRONIZED, INTERCONNECTED PROCESSING ELEMENTS FOR IMPLEMENTING MACHINE LEARNING NETWORKS

BACKGROUND

1. Technical Field

This disclosure relates generally to the implementation of machine learning networks.

2. Description of Related Art

Machine learning is a powerful recent trend in technology. In machine learning, a model is developed to perform a certain task. The model, which will be referred to as a machine learning network, is trained and deployed in order to carry out that task. For example, a model may be developed to recognize the presence of objects within images captured by a set of cameras. Once the model is deployed, images captured by the cameras are input to the machine learning network, which then outputs whether or to what confidence level the learned objects are present within the images.

Machine learning networks typically require a large number of computations and a correspondingly large volume of data transfers. As a result, they are commonly implemented in compute facilities with access to significant resources, such as in the cloud or on server clusters with access to complex networking. However, the sources of input to machine learning networks may be located remotely from these compute facilities. For example, cameras and other types of sensors may be located on the edge of the network.

Therefore, it can be advantageous if the machine learning network and computing elements on which it executes was instead embedded on edge devices, such as combined with the camera system.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIGS. 2A-2E shows a series of data transfers used to collect data from input slices for computation of output slices.

FIG. 6A shows a partitioning of a tensor into spatial and channel slices.

FIG. 7A is a block diagram of a system with a machine learning accelerator (MLA) and corresponding compiler.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Machine learning networks (MLNs) typically require a large number of computations and the handling of a large amount of data for those computations. Most MLNs have an architecture that includes multiple layers, with each layer containing many nodes. A typical node for layer j in a machine learning network may compute an output:

$$y_j = F_j\left(\sum w_{ij} x_i + b_j\right) \tag{1}$$

where $x_i$ are the input data to the current layer received from nodes i of a previous layer, $w_{ij}$ are weights, and $b_j$ is a bias and $F_j(\ )$ is a nonlinear operator for the current layer j. These operations may be expressed as tensors:

$$Y = F(WX + B) \tag{2}$$

where Y is the output tensor of the current layer, X is the input tensor to the current layer from the previous layer, W is a weight tensor, and B is a bias tensor.

The tensor operation Z=WX or Z=WX+B, where X is the input tensor and Z is the output tensor for a layer before application of any nonlinear operator, typically requires a large number of computations which may be allocated to many hardware processing elements (PEs) to compute in parallel. However, in order for a PE to complete the computations allocated to it, the relevant input data must be available to the PE. For the first layer, the input tensor X may be input samples received from external sources. For later layers, the input tensor X typically are outputs computed for previous layers. Including these intermediate values, there may be millions, billions, trillions or even more pieces of data that must be transferred to the correct PEs at the right time in order to implement a machine learning network. It would be beneficial to design and schedule these data transfers in a manner that reduces latency (e.g., time required to complete the data transfers) and power consumption (e.g., power required to complete the data transfers).

Figure 1:
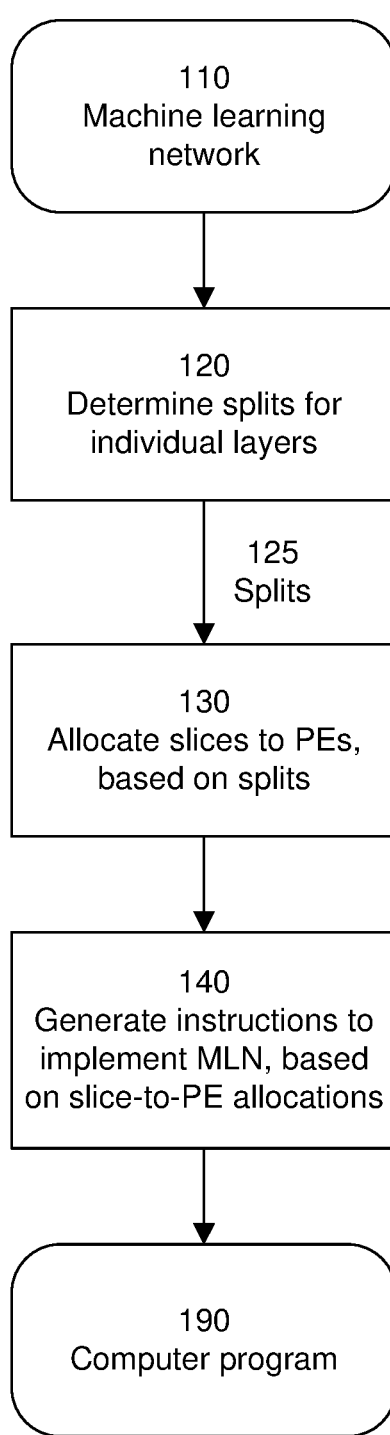
FIG. 1 is a flow diagram for generating a computer program to implement a machine learning network.

In one approach, this is achieved by considering different allocations of computations to PEs, for example as shown in FIG. 1. In FIG. 1, a computer system receives a description of a machine learning network 110 and generates a computer program 190 that implements the MLN. The computer program contains instructions that will be executed on the PEs of a machine learning accelerator (MLA). The PEs are interconnected by data transfer paths that are known to the compiler.

The MLN includes tensor operations such as those described above in which an output tensor (Z) of a layer is computed as a weighted sum of an input tensor (X) for the layer. At 120, "splits" 125 for the individual layers are determined. Splits 125 partition the tensors into slices for computation by the PEs. In a common nomenclature, tensors are described with three dimensions: two spatial dimensions (row and column, or p and q) and a third channel dimension k. The tensor has a size P×Q×K, where P, Q and K are the number of elements along each dimension. P×Q is the spatial size and K is the channel size. The partitioning may be described by a "split"=$(P_S, Q_S, K_S)$ for that layer, where $P_S$, $Q_S$ and $K_S$ are integers. Each integer defines the number of slices along each dimension. For example, a split of (3,4,2) means the p spatial dimension (the rows) is partitioned into 3 row slices, the q spatial dimension (the columns) is partitioned into 4 column slices, and the k dimension (the channels) are partitioned into 2 channel slices. Thus, each slice in this partitioning contains ⅓ the total number P of rows, ¼ the total number Q of columns and ½ the total number K of channels, and there is a total of 3×4×2=24 slices for the tensor. In one approach described herein, layers that have the same spatial size P×Q are constrained to have the same split $(P_S, Q_S, K_S)$, even if they have different channel sizes K.

At 130, the slices are allocated to PEs for computation, according to the split selected for each layer. At 140, instructions that implement the computations and data transfers to execute the MLN are generated, based on the slice-to-PE allocations 130.

In one architecture, a computer system includes a module that performs step 120. This may be referred to as an autosplit engine. Steps 130 and 140 are performed by a compiler. The autosplit engine may or may not be incorporated as part of the compiler.

In some approaches, the layers of the MLN are executed sequentially, one layer at a time. Layer 1 is executed first, then layer 2, then layer 3, and so on. The output values of each layer are used as input values to the next layer. If the layers are partitioned at their outputs, then each slice is a subset of the output values for that layer. Each slice is allocated to a PE, which computes the output values for that slice. In order to compute the output values, the PE must have access to the corresponding input values. If input values are not stored at the PE as a result of the computations for the previous layer, they are transferred from their current PE location to the PE calculating the output values for that slice.

The splits determined at 120 affect the number of data transfers required, which in turn affects the time and power required to execute the MLN. The interaction between splits for adjacent layers can also add time and power, particularly if the splits are different so that data must be rearranged between layers.

Figure 2A:
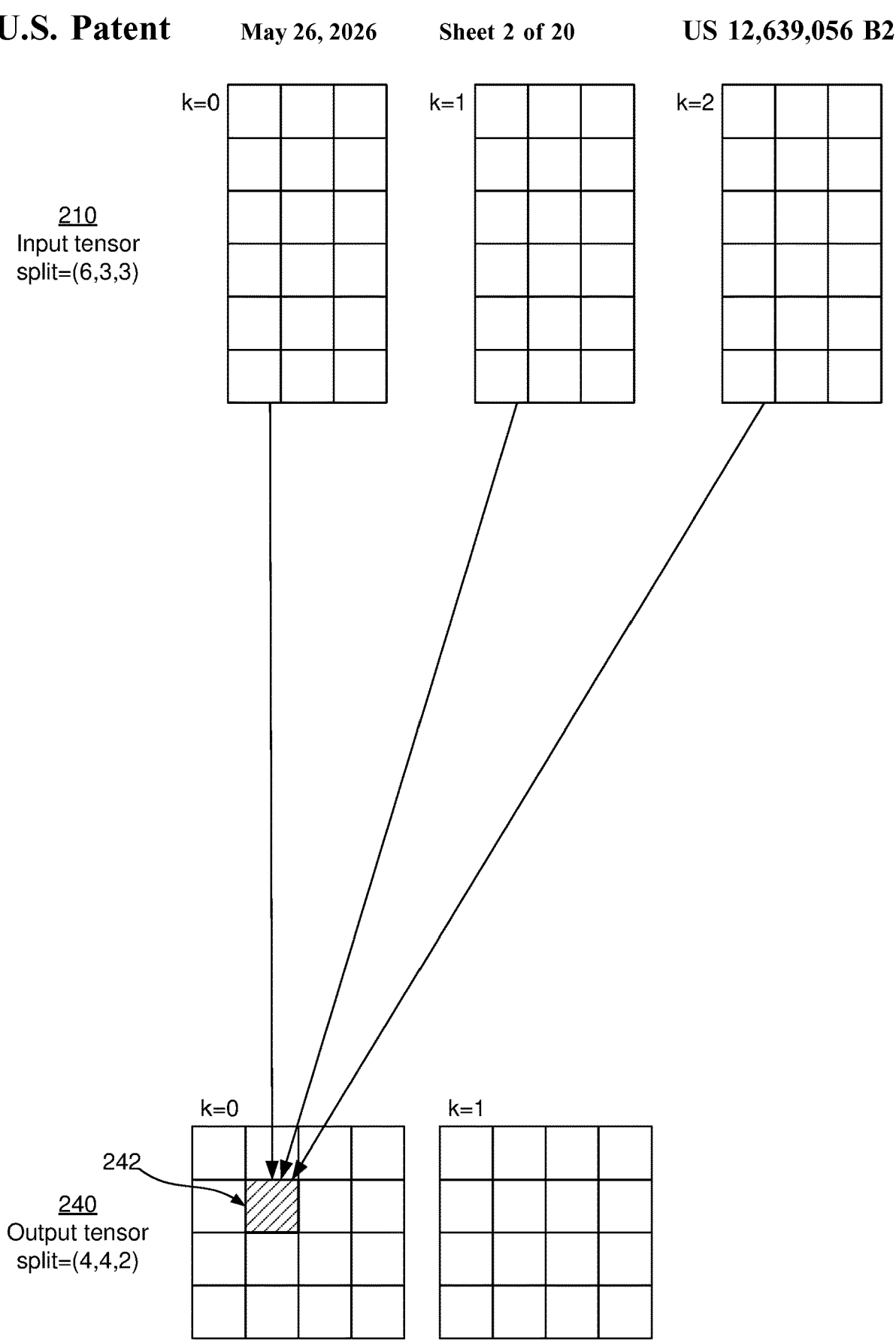

FIGS. 2A-2E show a series of data transfers used to collect data from input slices for the computation of output slices. In this example, the input tensor 210 has a split (6,3,3) and the output tensor 240 has a split (4,4,2) as shown in FIG. 2A. In the figures, each row is a tensor, and each rectangle in the row is a channel slice of that tensor. The input 210 is the output of the computation from the previous layer. The input tensor 210 has 3 channel slices labeled k=0, k=1 and k=2 in FIG. 2A, each of which has a 6×3 array of spatial slices, for a total of 6×3×3=54 slices. The values for each of these slices was computed by a corresponding PE and is stored locally at that PE. For this layer, the output tensor 240 has 2 channel slices labeled k=0 and k=1, each of which has a 4×4 array of spatial slices, for a total of 4×4×2=32 slices. Each of these output slices is also allocated to a PE that computes the values of the output slice. Each output slice is computed using data from various input slices. The input slices that contribute to the values in an output slice are the "support" for that output slice. In order to do these computations, data is transferred from the PEs for supporting input slices to the PE calculating the corresponding output slice.

Figure 2B:
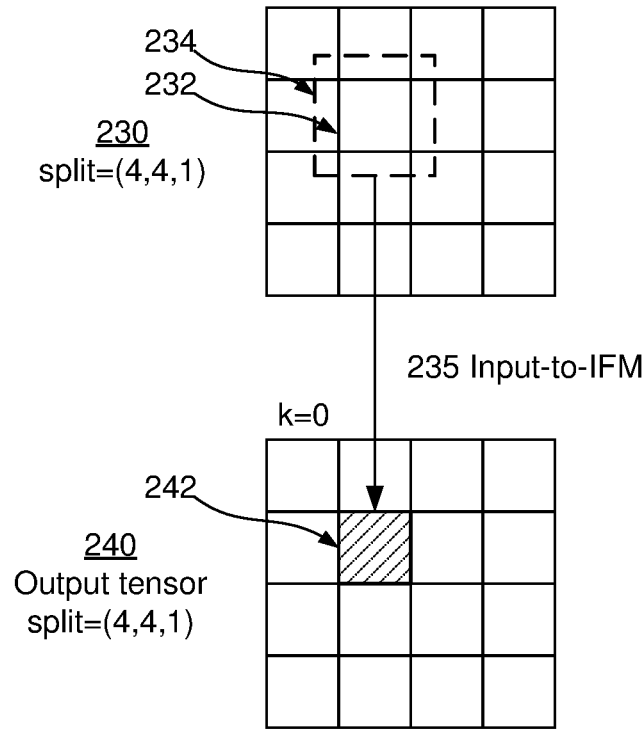
Figure 2C:
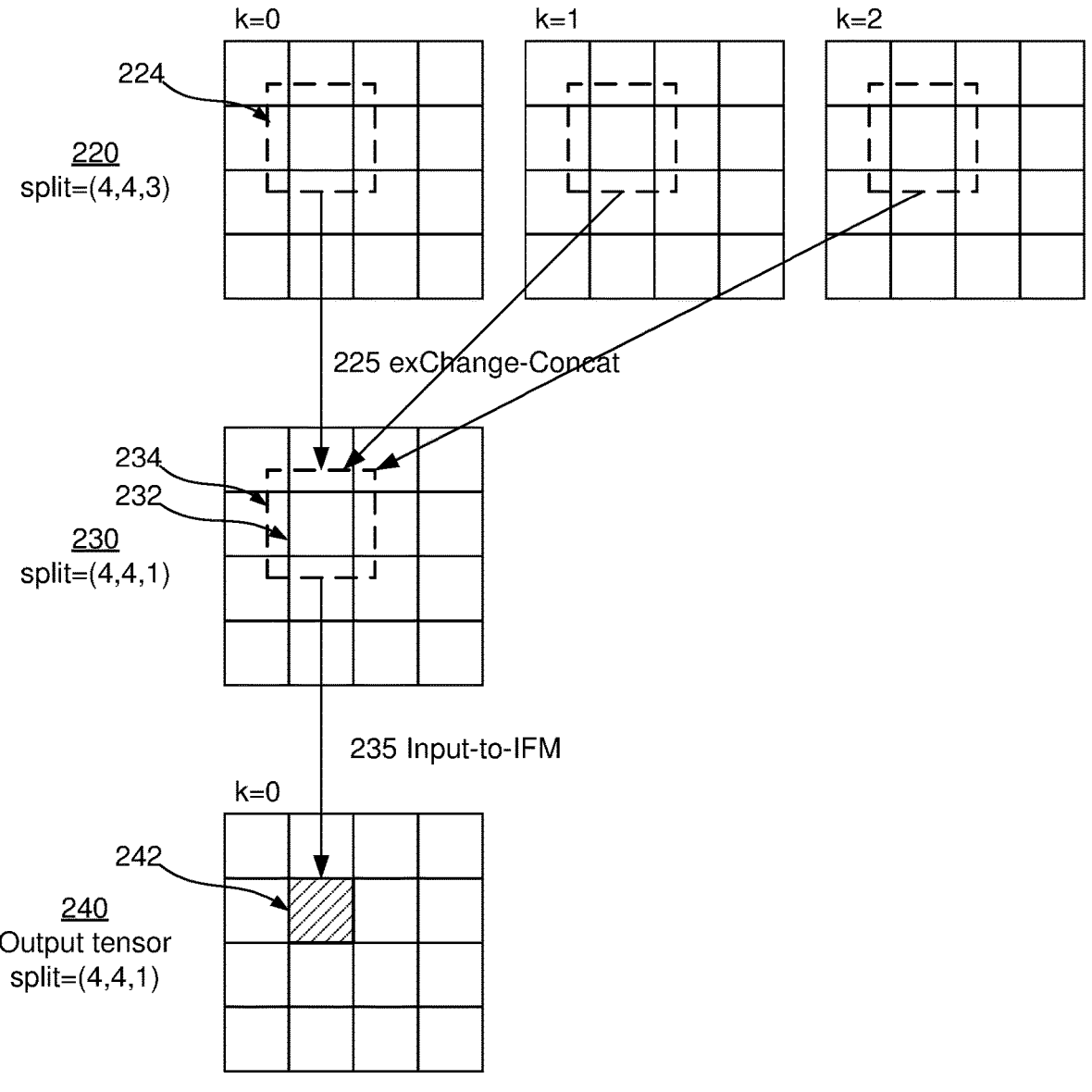

FIGS. 2A-2D shows the data transfer for the calculation of output slice 242 (p=1,q=1,k=0). The data transfer is accomplished in three stages working backwards from the output slice 242, as shown in FIGS. 2B-2D. In FIGS. 2B-2D, ignore the output channel k=1 for the moment. In that case, the one channel of the output tensor may be treated as having a split (4,4,1).

In FIG. 2B, assume that the tensor 230 used to calculate output tensor 240 has the same split (4,4,1). In this case, there is a one-to-one correspondence between input and output slices. For example, input slice 232 corresponds to output slice 242, meaning that the PE that computed the values for slice 232 (as the output of the previous layer) is the same PE that will compute the values for output slice 242. To the extent that output slice 242 depends on values from input slice 232, those values are already stored in the correct PE. However, the support for output slice 242 may be larger than just the corresponding slice 232. For example, if computation uses convolution with a finite size kernel, then the support typically includes adjacent slices. In FIG. 2B, the support is shown by dashed rectangle 234. In data transfer stage 235, data is transferred from the slices within support 234 to the output slice 242. More accurately, data is transferred from the PEs for the supporting slices 234 to the PE that calculates output slice 242. Stage 235 may be referred to as Input-to-IFM. Examples of Input-to-IFM are described in U.S. patent application Ser. No. 18/158,447, "Layout-Based Data Transfer between Synchronized, Interconnected Processing Elements for Implementing Machine Learning Networks," which is incorporated herein by reference.

Of course, the input tensor will not always have the same split as the output tensor. In FIG. 2C, this requirement is relaxed and the source tensor 220 is allowed to have a different channel split. It still has the same spatial split (4,4) as the output tensor 240, but it has a different channel split. In this example, the source tensor 220 has split (4,4,3), as shown by channel slices k=0, k=1 and k=2. The support for output slice 242 may include data from multiple channel slices. In the general case, all of the channel slices provide support for output slice 242. In FIG. 2C, the support from each channel slice is shown by the dashed rectangle and is labeled as 224 for channel slice k=0. Since output slice 242 is channel slice 0, data transfer stage 225 transfers data from channel slices 1 and 2 to channel slice 0. The data is transferred between different channel slices but staying within a same spatial slice.

Tensor 230 then includes the data from all channel slices for each spatial slice, and stage 235 uses Input-to-IFM to collect these within output slice 242 for calculation. In some cases, the channel support may be more limited so that not all channel slices are relevant. For example, if output slice 242 depends only on channel slices 0 and 1, but not channel slice 2, then stage 225 could transfer data from only these channel slices. This stage 225 may be referred to as eXchange-Concat, since the PEs for the different channel slices are exchanging and concatenating data.

In FIG. 2D, the requirements on the input tensor 210 are further relaxed to allow the input tensor 210 to also have a different spatial split than the output tensor 240. In this example, input tensor 210 has spatial split (6,3) while output tensor 240 has spatial split (4,4). At data transfer stage 215, data transfers are used to remap the input spatial split (6,3) to the output spatial split (4,4) but with the same channel split $K_s$=3 in this example. In this stage, data is transferred between different spatial slices but not between different channel slices. In FIG. 2D, the dashed rectangles 214 show the support corresponding to support 224 for tensor 220. In this stage 215, the data from the spatial slices in inputs 210 are transferred to the corresponding spatial slices in tensor 220. This stage 215 may be referred to as Change-in-Splits. If the input and output spatial splits $(P_S, Q_S)$ are the same, then stage 215 is not needed.

Figure 2E:
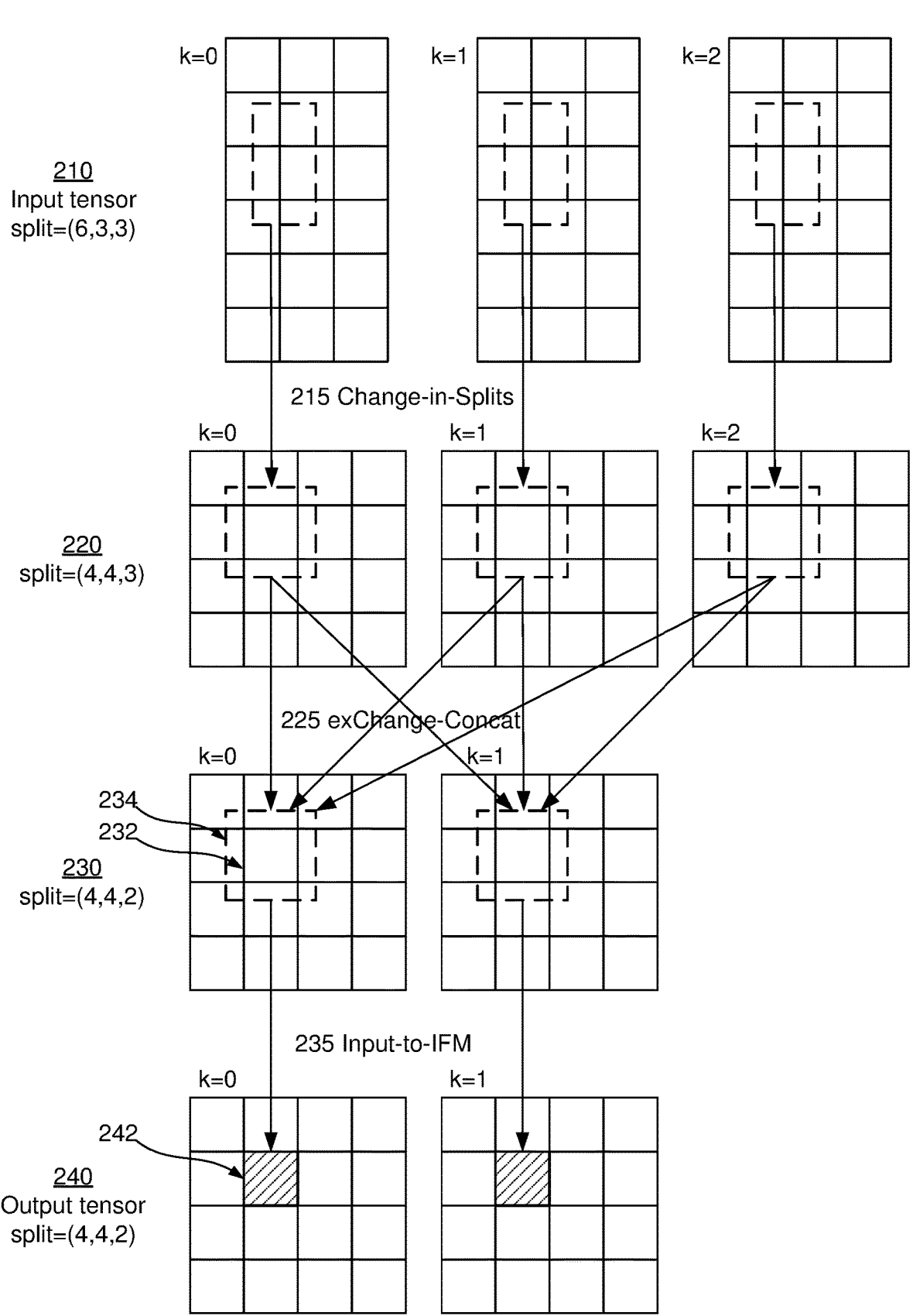

In FIGS. 2B-2D, the output tensor was assumed to have $K_s$=1. FIG. 2E relaxes that requirement. In the original statement of FIG. 2A, the output tensor has a channel split $K_s$=2. FIG. 2D shows the data transfers for mapping input slices to output slices for channel slice 0. FIG. 2E adds the corresponding data transfers for mapping input slices to output slices for channel slice 1. The Change-in-Splits stage 215 is the same as in FIG. 2D so no additional data transfers are needed. For the eXchange-Concat stage 225, the data from the different input channel slices is duplicated for both output channel slice 0 (as previously shown in FIG. 2D) and channel slice 1 (as added in FIG. 2E), so that each output channel slice has access to data from all channels. Data is transferred between different channel slices but staying within a same spatial slice. If both the input tensor 210 and output tensor 240 have a channel split of $K_s$=1, then the eXchange-Concat stage 225 is not needed. The Input-to-IFM stage 235 for channel slice 1 is similar to the Input-to-IFM stage in FIG. 2D for channel slice 0. In tensor 230, the data has been remapped to the output spatial split, and data from different channels has been duplicated to calculate the output 240. In Input-to-IFM stage 235, data is transferred between different spatial slices within the same channel slice. In the result 240, each PE stores all of the data needed to compute the corresponding output slice.

FIGS. 2A-2E show the data transfers for computing one output spatial slice 242, given the general case of different splits for input tensor 210 and output tensor 240. The output tensor 240 has many output slices. The data transfers are divided into stages as shown, because data transfers for different output slices may be performed in parallel without interfering with each other.

The cost of executing an MLN depends on the costs for the different data transfers shown in FIG. 2 for all layers and also depends on the costs for computation. The costs could be time costs, such as the latency or time required to execute the MLN. They could also be power costs, such as power consumption or power required to execute the MLN. The splits determined at 120 affect these costs. Smaller splits mean there are fewer slices with more nodes and computations per slice. If each slice is allocated to a PE and PEs can complete computations at a certain rate, then the time or power consumed may be measured by the number of computations performed by each PE. The PEs may perform matrix multiplications of a predefined size. In that case, the cost may be based on the number of matrix multiplies of that predefined size performed by each PE.

In many cases, latency can be decreased by increasing the number of PEs used to perform computations, so long as that is not offset by the time required for data transfer between PEs. Power consumption can be decreased by reducing idle time of the PEs. A PE that is idling 20% of the time still consumes power during the idle time but without progressing the MLN calculation. Idling may be the result of mismatch between the slice size and the PE capability. For example, if the PE is designed to multiply 16×16 matrices, but the split results in a slice that uses 17×17 matrices, then the mismatch in size will result in significant PE idle time.

The costs may be estimated using models, such as cost functions that are a function of various parameters that depend on the splits. Alternatively, the costs may be estimated using simulations of the execution of the MLN.

Figure 3:
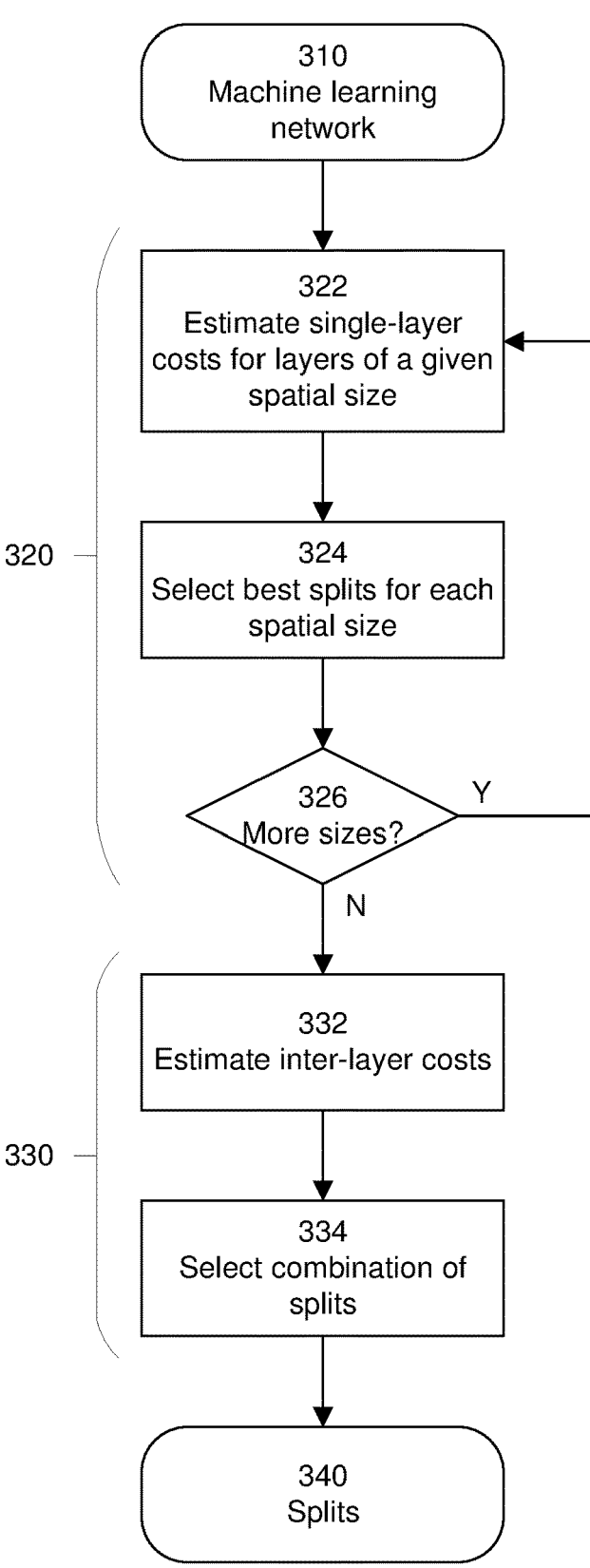
FIG. 3 is a flow diagram for determining splits for individual layers of a machine learning network.

FIG. 3 is a flow diagram for determining splits for the layers of the MLN (step 120 of FIG. 1). Conceptually, step 120 finds a set of splits {S(j)} that optimizes some cost function, where j is the index for the layer. An MLN can have many layers j, and there can be many possible splits $(P_s, Q_s, K_s)(j)$ for each layer j. The design space of all possible combinations of different splits for all different layers can be very large, and finding good solutions within that design space can take a long time, if possible at all. Rather than optimizing the cost function with respect to all possible designs in a single loop, the approach of FIG. 3 subdivides the design into two stages 320, 330 by considering different contributions to the cost function.

Stage 320 considers the costs of data transfer between different PEs assuming that the inputs and outputs of the individual layers have a same spatial split $(P_s, Q_s)$. Because this cost arises from data transfers within a layer, it is referred to as a single-layer cost. In FIG. 2, the costs of Input-to-IFM 235 and eXchange-Concat 225 are included in stage 320. Stage 320 may also include costs of computation, since that depends primarily on the split for each individual layer.

Stage 330 includes the costs of data transfer between PEs resulting from differences in the spatial splits for inputs and outputs of individual layers. Because this cost arises from differences between adjacent layers, it is referred to as an inter-layer cost. In FIG. 2, the cost of Change-in-Splits 215 is included in stage 330.

In addition, in both stages 320 and 330, splits for layers are constrained as follows. Layers that have the same spatial size P×Q are constrained to have the same split $(P_s, Q_s, K_s)$. Thus, the single-layer cost of a given split $(P_s, Q_s, K_s)$ is not evaluated for just one layer. Rather, it is evaluated for all layers that have the same spatial size P×Q since they all will have the same split. As a result of this constraint, every layer cannot have a different split and the dimensionality of the design problem is significantly reduced. Rather than a design problem that is a function of the number of layers, which could be hundreds or even thousands, the design problem is now a function of the number of different spatial sizes, which may be on the order of ten.

In stage 320, layers are grouped by their spatial size and layers of different spatial sizes are considered separately. At 322, the single-layer costs of executing layers of the same spatial size using different splits $(P_s, Q_s, K_s)$ are estimated. This may include the costs for Input-to-IFM and for eXchange-Concat, but not the costs for Change-in-Splits. At 324, candidate splits are selected based on the estimated single-layer costs for these same-spatial-size layers. This is done separately for each spatial size, as indicated by the loop 326. The result is a set of candidate splits for each spatial size.

In stage 330, the interactions between layers of different spatial sizes are considered. At 332, the inter-layer costs for different combinations of candidate splits are estimated. This is a problem of reduced size, because only the candidate splits from stage 320 are considered, rather than all possible splits for all layers. At 334, the inter-layer costs are used to select from among the different combinations. The selection may also include the single-layer costs from stage 320, particularly since they have been previously computed. If the design space is small enough, stage 330 may be performed by considering all possible combinations of candidate splits to identify good combination(s) 340 of splits for the MLN. Alternatively, pruning techniques or optimization techniques may be used to select good combinations 340 from the design space.

Figure 4:
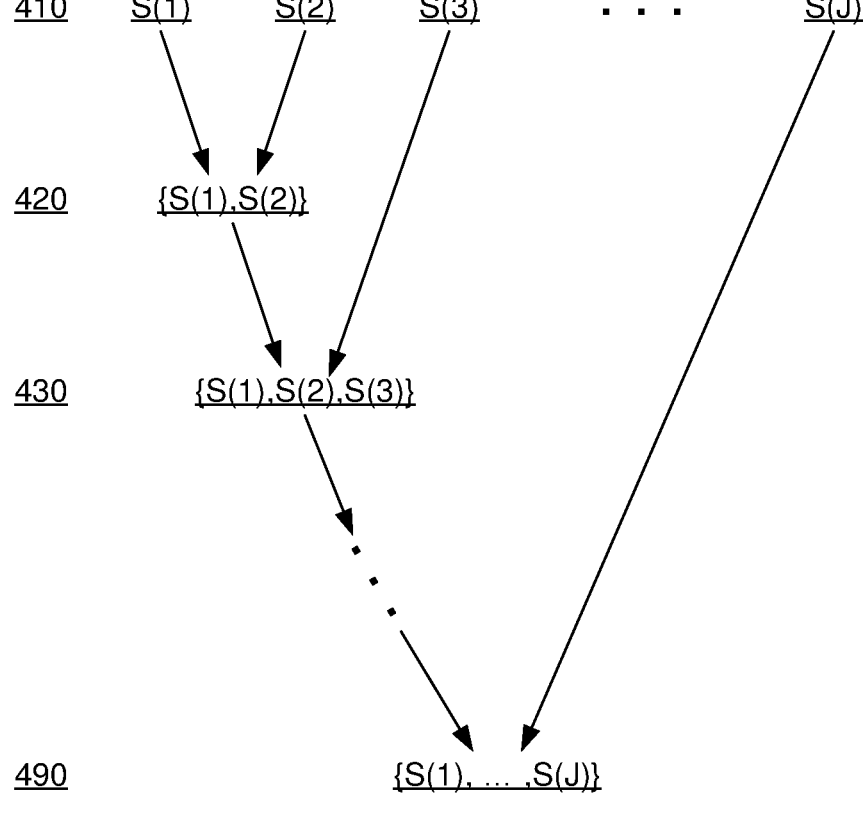
FIG. 4 is a diagram for evaluating different combinations of splits for different layers.

FIG. 4 is a diagram of one approach to search the design space of possible combinations. This approach proceeds in iterations. At the starting point 410, the candidate splits S(j) for different spatial sizes j has been determined from step 320. Here, the underline indicates that there is more than one candidate split for that spatial size. S(1) are the candidate splits for the layers of spatial size P1×Q1, S are the candidate splits for the layers of spatial size P2×Q2, etc. In a first iteration 420, combinations of the candidate splits S(1) and S(2) are evaluated, assuming that some layer of spatial size S(1) is adjacent to some layer of spatial size S(2). The result {S(1),S(2)} is combinations of the splits for the sets 1-2. Rather than keeping all possible combinations for this set, a subset of the combinations may be kept for further consideration. In the next iteration 430, combinations of {S(1), S(2)}, S(3) are considered. The result {S(1), S(2), S(3)} is combinations of the splits for the sets 1-3. As the iterations progress, the number of different spatial sizes considered increases until the final iteration 490 yields combination(s) {S(1), . . . , S(J)} for the entire MLN.

Because inter-layer costs can be large compared to the single-layer costs, one approach is to reduce the inter-layer costs. For example, the selection may use a process that reduces the number of occurrences where adjacent layers have different spatial splits. This eliminates the Change-in-Splits cost between those two layers. In the above example, iteration 420 may be biased to use the same splits for layers 1, 2, 3. More generally, the iterations may be biased to use the same splits for adjacent layers.

Referring to FIG. 1, step 130 allocates slices to PEs for computation. In one approach, the allocation has the following characteristics. First, the spatial slices are typically a rectangular array organized into rows and columns. If two spatial slices are adjacent to each other in the same row, then the corresponding PEs are connected to each other. This allows for data transfer between rows of spatial slices. In addition, the PEs for spatial slices at the ends of adjacent rows are also connected to each, which allows for data transfer between adjacent rows. This is illustrated in FIG. 5 below. Second, if there is more than one channel slice, then the collection of PEs for each channel slice has the same layout shape. This is illustrated in FIG. 6 below.

Figure 5A:
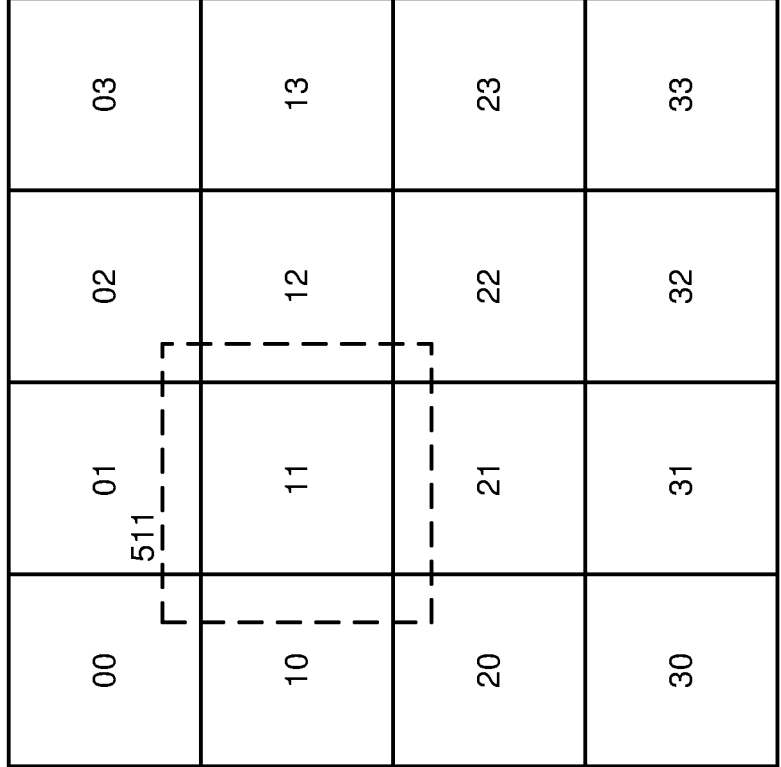
FIG. 5A shows a partitioning of a tensor into spatial slices.

FIG. 5A is a diagram of a tensor 500. It is partitioned into 16 spatial slices labelled 00-33. This tensor has only one channel slice. For tensors that are partitioned into more than one channel slice, FIG. 5A would represent the spatial slices within a single channel slice. In MLN computations, Input-to-IFM data transfer often is from neighboring slices. Here, the dashed support rectangle 511 indicates that data is to be transferred from each of the neighboring slices to slice 11.

Figure 5B:
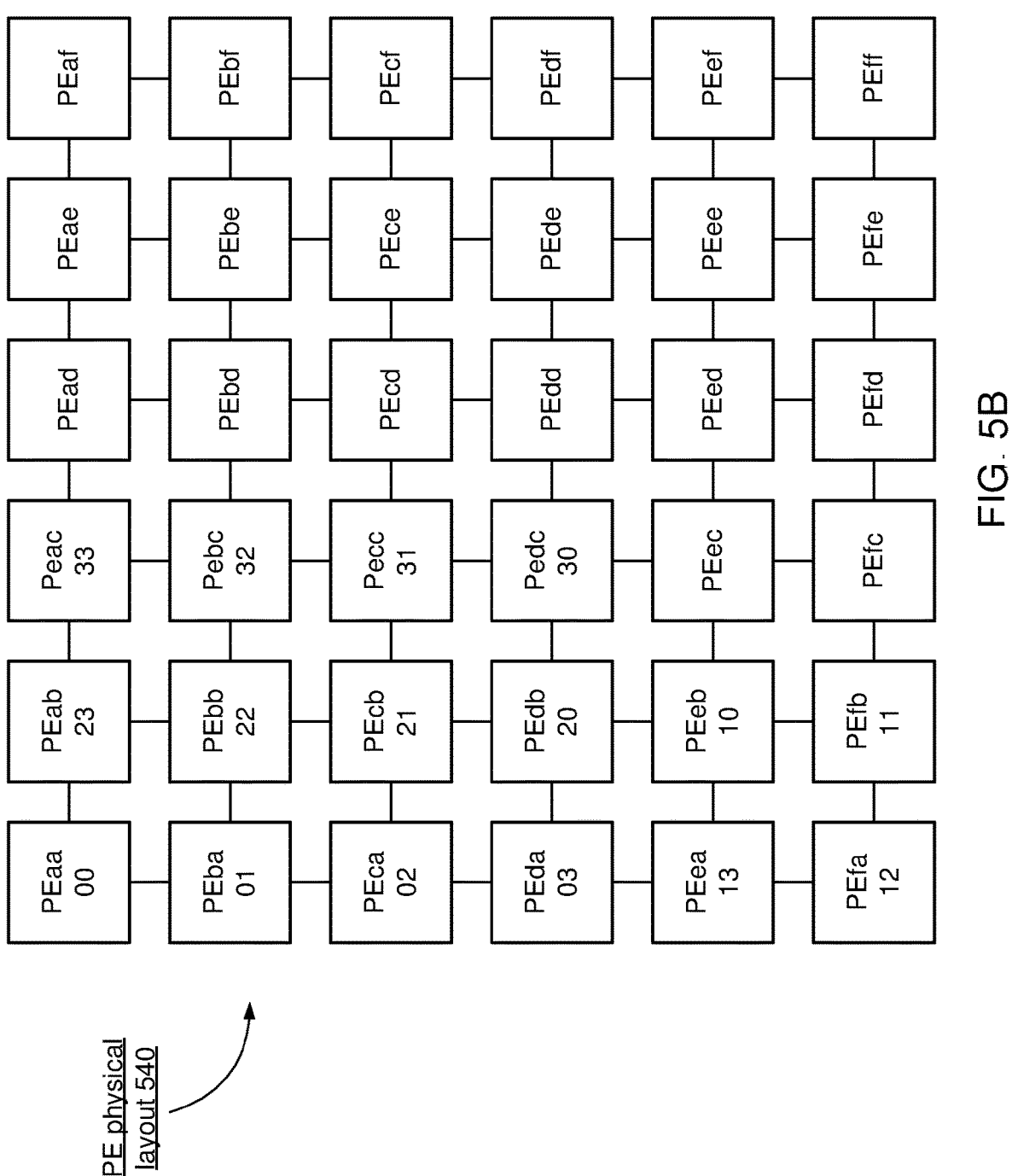
FIG. 5B shows a physical layout of processing elements (PEs), with an allocation of slices to PEs.

FIG. 5B shows a physical layout 540 of a 6×6 array of PEs, which are labelled aa-ff. Adjacent PEs are connected by data transfer paths, as indicated by the lines between PEs. FIG. 5B also shows the allocation of slices to PEs, as indicated by the two digit numbers in some PEs. Slice 00 is allocated to PEaa, slice 01 is allocated to PEba, slice 02 is allocated to PEca, and so on.

Figure 5C:
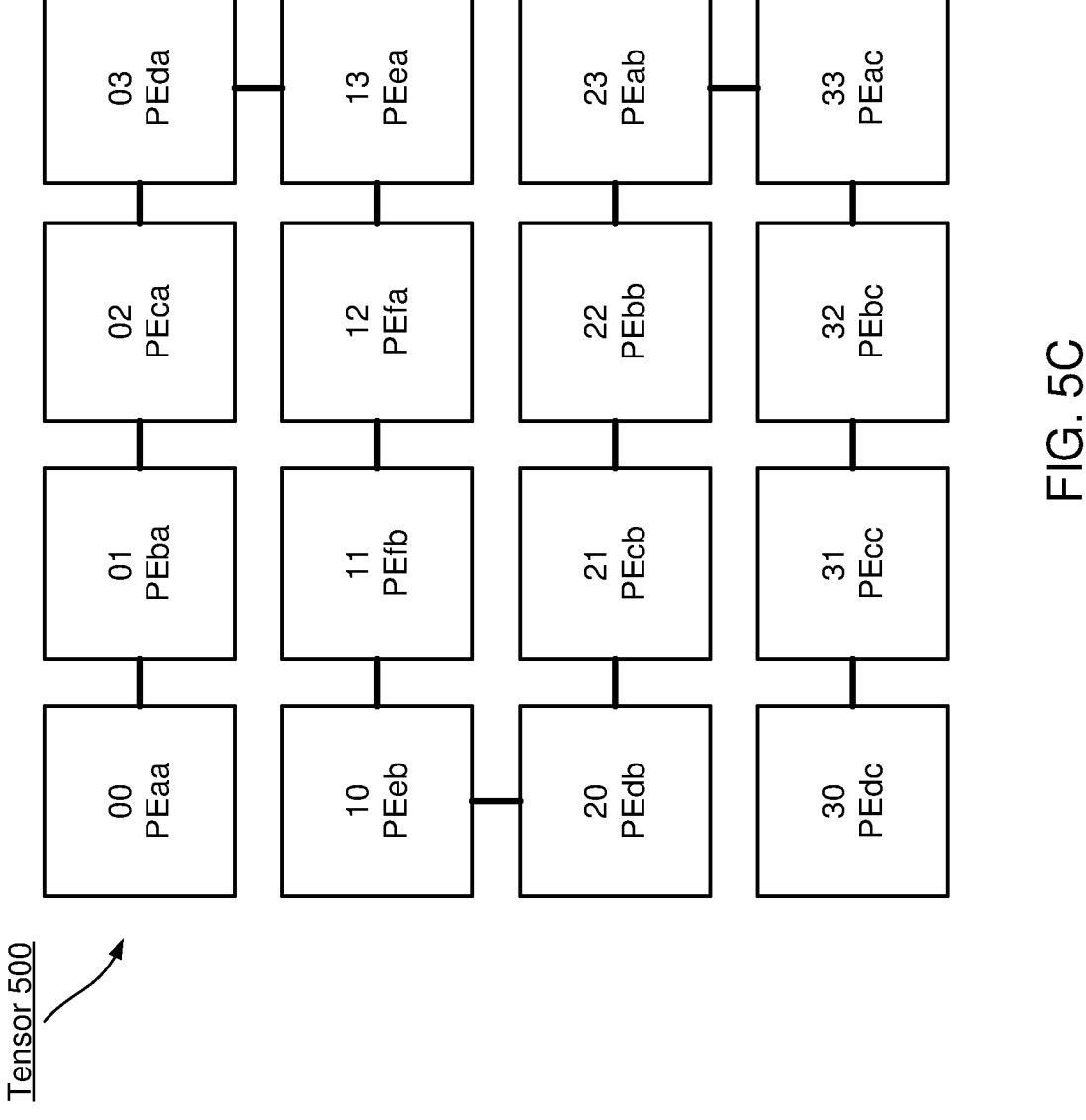
FIG. 5C shows the spatial slices of FIG. 5A overlaid with physical data transfer paths.
Figure 5D:
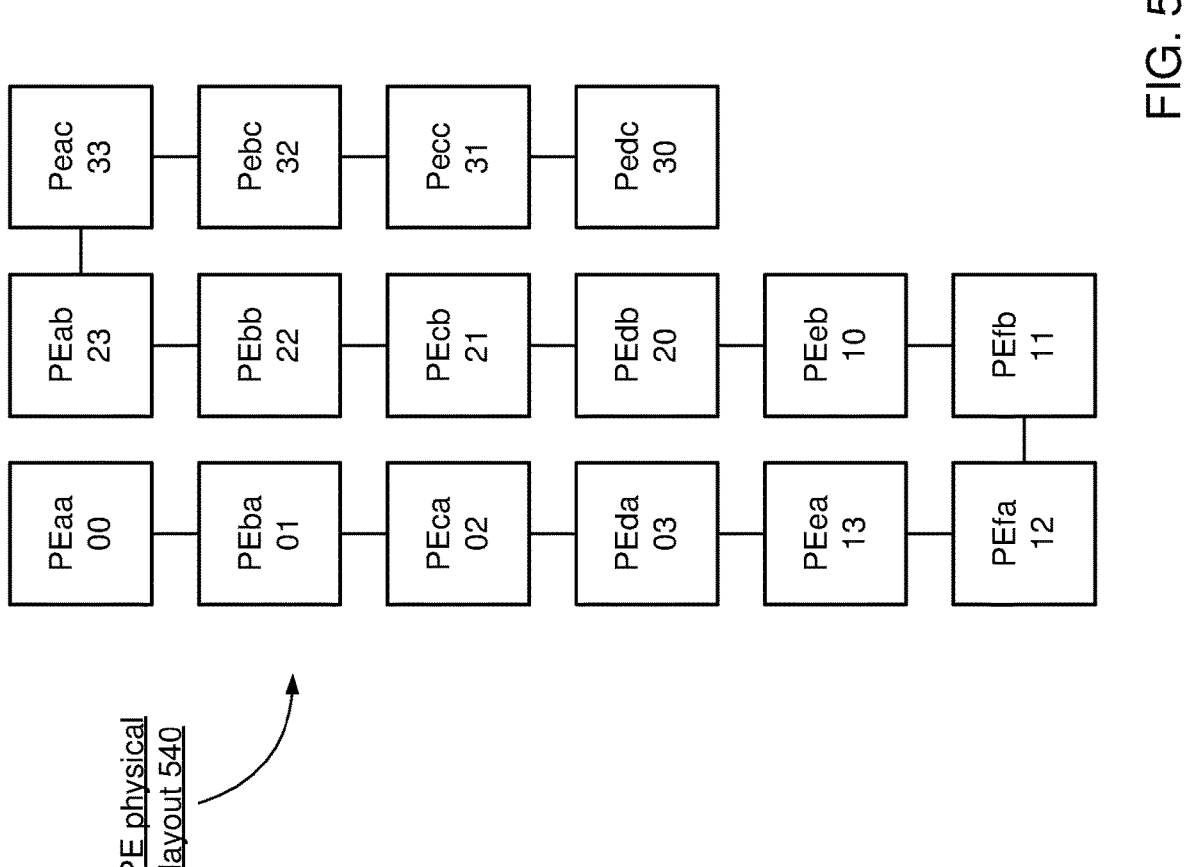
FIG. 5D shows the physical layout of PEs and data transfer paths from FIG. 5C.

FIG. 5C combines the information in FIGS. 5A and 5B. The 4×4 array in FIG. 5C is the slices from FIG. 5A. Each slice is labelled with the corresponding PE. Slice 00 is allocated to PEaa, and so on. The lines between boxes represent some of the available data transfer paths between PEs. There are more data transfer paths than shown, but FIG. 5C shows the paths of interest for this example. Not all slices are necessarily connected to their neighbors, because the corresponding PEs may not be neighboring. For example, there is no data transfer path between slice 00 (physical PEaa) and slice 10 (physical PEeb), because these PEs are not neighbors even though the slices are neighbors. The PEs for each row of spatial slices are connected to each other, as indicated by the horizontal connections in FIG. 5C, and the rows of spatial slices are also connected to each other, as indicated by the vertical connections at the ends of rows. The data connection patterns facilities Input-to-IFM data transfers. The connections shown form a continuous path through the slices for data transfer. FIG. 5D is the physical layout of PEs but showing only the connections from FIG. 5C. The PEs are connected in a continuous path from slice 00 (PEaa) to slice 33 (PEfb).

Figure 6B:
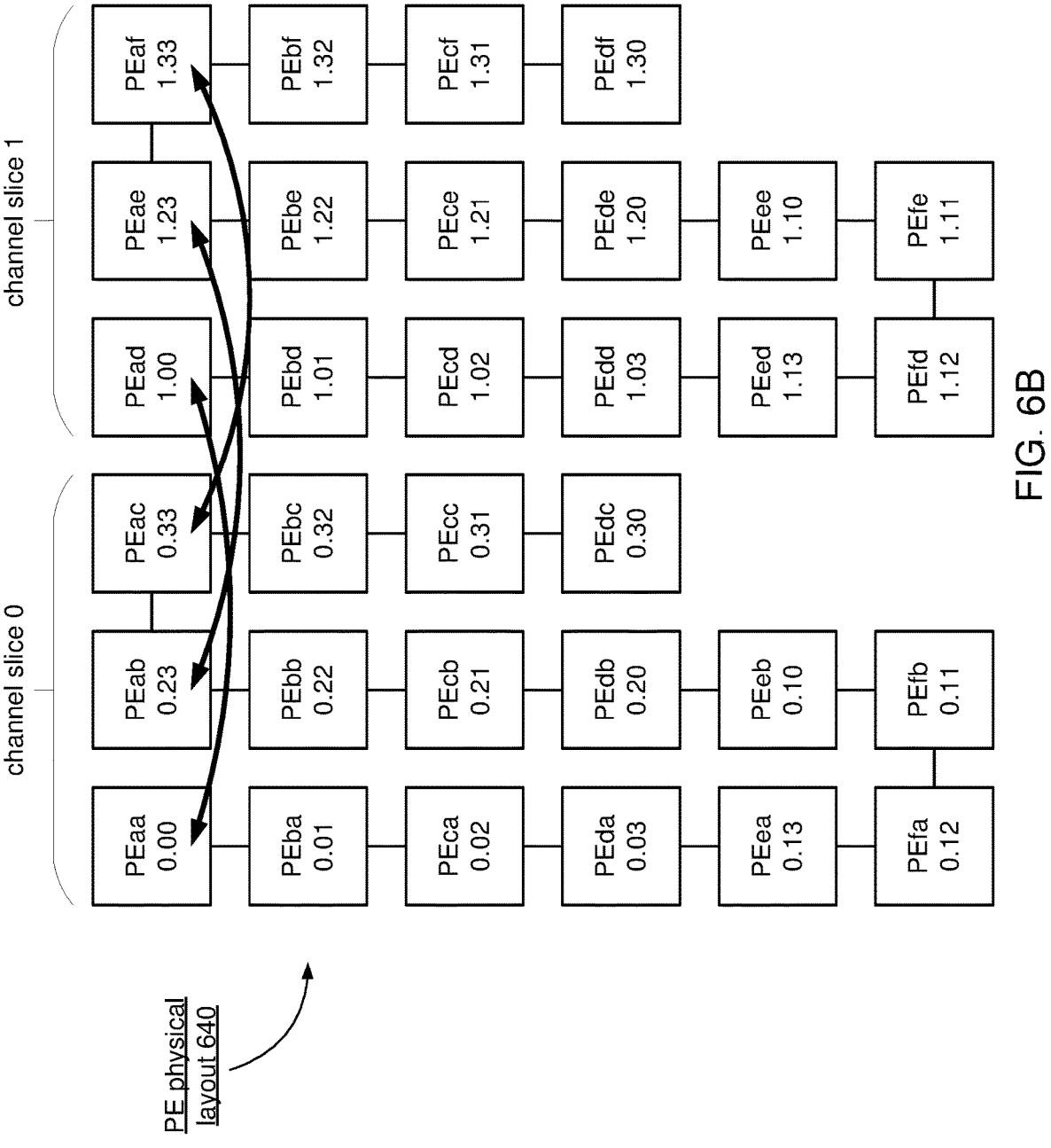
FIG. 6B shows a physical layout of PEs and data transfer paths for the partitioning of FIG. 6A.

FIG. 6A shows a tensor 600 with two channel slices. The tensor is partitioned into 16 spatial slices, as in FIG. 5A. The slices are labelled k·pq, so 0.00 is channel slice 0 and spatial slice 00; 1.00 is channel slice 1 and spatial slice 00; and so on. FIG. 6B is a diagram similar to FIG. 5D. It shows the physical layout 640 of the PEs, and the labels indicate the allocation of slices to PEs. Within each of the channel slices 0 and 1, the spatial slices are connected as shown in FIGS. 5A-5D. Thus, Input-to-IFM data transfers can be accomplished as described in FIG. 5.

Furthermore, each of the two channel slices has the same shape layout of PEs, to facilitate eXchange-Concat data transfers. These transfers are between different channel slices of the same spatial slice. For example, data may be transferred between slices 0.00 and 1.00, or between 0.23 and 1.23, or between 0.33 and 1.33, as indicated by the curved double arrows in FIG. 6B. Because the two channel slices have the same shape and layout, corresponding spatial slices have the same relative position. Slice 0.00 is three PEs to the left of slice 1.00, as are slices 0.23 and 1.23, and slices 0.33 and 1.33. As a result, eXchange-Concat data transfers are simplified and efficient. All PEs in channel slice 0 can transfer data to the right by 3 PEs. This can be done without conflicts. Then all PEs in channel slice 1 can transfer data to the left by 3 PEs.

In some cases, the allocations of slices to PEs may be pre-computed. FIG. 6B shows one allocation of a split (4,4,2) onto a 6×6 array of PEs (36 total PEs). There are not many ways to allocate a split (4,4,2) onto a 6×6 array of PEs. As a result, preferred allocations may be tabulated, and the compiler may use these or select from among them if there is more than one alternative.

Additional examples and descriptions for allocating slices to PEs are described in U.S. patent application Ser. No. 18/158,447, "Layout-Based Data Transfer between Synchronized, Interconnected Processing Elements for Implementing Machine Learning Networks," which is incorporated herein by reference.

FIGS. 7-8 describe an example MLA suitable for implementing MLNs as described herein. This example MLA includes a rectangular array of PEs and data transfer paths implemented on a single semiconductor die where the instruction execution is statically scheduled, but the techniques described herein are not limited to this example. The PEs may take different forms, including different cores of a multi-core processor and separate processing chips. The data transfer paths may also include paths within a die, paths between different dies, and even network connections that span larger distances. The instructions also are not required to be statically scheduled.

FIG. 7A is a block diagram of one example of a system with a machine learning accelerator (MLA) 770 and corresponding compiler 720, such as described above. The compiler 720 receives a description of a machine learning network (MLN) 700 and generates a computer program 750 that implements the machine learning network using MLA 770. The computer program 750 includes instructions that are executed by processing elements (Tiles) in the MLA according to a static schedule determined by the compiler. The instructions executed by the Tiles (Tile instructions) are statically scheduled because the compiler can determine which instructions are executed by which Tiles at what times, as will be explained in greater detail below.

For example, for the statically scheduled instructions, there are no conditions, branching or data dependencies that can be resolved only at run-time, and which would affect the timing and order of the execution of the instructions. Note that the static schedule determined by the compiler may or may not be included as part of the instructions and computer program. In some embodiments, the computer program may expressly include the schedule, specifying that instruction A is executed at cycle X, instruction B is executed at cycle X+4, instruction C is executed at cycle X+12, etc. In alternate embodiments, the computer program may specify only that instruction A is executed, followed by instruction B, and then instruction C, but without any scheduling information. Even though the static schedule is not expressly specified, these instructions will still execute according to the schedule determined by the compiler because the compiler knows how long it takes to execute each instruction. As a result of the static scheduling, the MLA and instruction set for the MLA may be simplified, with the complexity offloaded to the compiler. A simpler MLA can result in lower cost, lower power consumption and higher performance, all of which are desirable for implementation in edge devices.

Figure 7B:
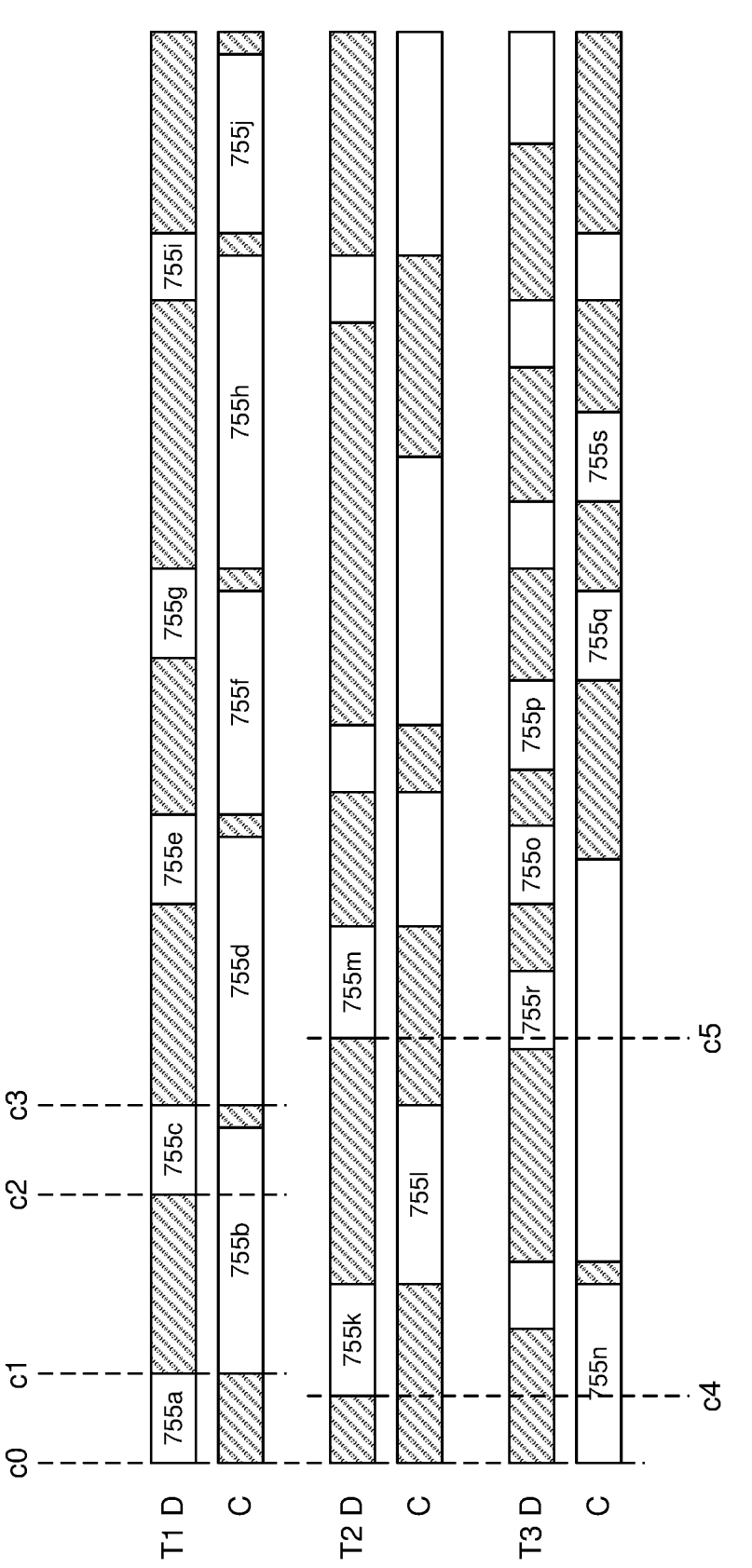
FIG. 7B illustrates execution of statically scheduled instructions.

In more detail, the MLN 700 may be described by an architecture and parameters. A depiction of an MLN is shown to the right of box 700 in FIG. 7A. Most MLNs include multiple layers 702, each with one or more nodes which are represented by circles in FIG. 7A. The lines between nodes in FIG. 7B represent interconnections between the nodes (and layers). Each node calculates a weighted sum of the values received from its connected nodes, possibly also applying a bias. Examples are matrix multiplication and convolution. Each node may also apply certain functionality (operators), such as nonlinear functions (e.g., tanh function), softmax operator, etc. A typical node may compute an output:

$$y = F\left(\sum w_i x_i + b\right) \tag{3}$$

where $x_i$ are the inputs received from other nodes i, $w_i$ are weights, b is a bias and F( ) is a nonlinear operator. The MLN architecture includes the number of nodes (and layers) and their interconnectivity, and the operators applied at nodes. The operators may be described in a parameterized form. The MLN parameters include the weights, biases, and parameters for the operators.

MLNs may vary in size, depending on the desired task. Small MLNs may have 5-10 or fewer layers, medium size MLNs may have 30-50 layers, and large MLNs may have 100 or more layers. Examples of inputs include text, images and video. Some of the layers may be fully interconnected (i.e., every node in one layer provides input to every node in the next layer), and others may be more sparsely and locally interconnected (e.g., to implement convolutions). Each weighted interconnect represents a scalar multiplication. The total number of scalar multiplications required to implement an MLN may be on the order of millions, billions, tens of billions or even more. These may be carried out by matrix multiplications.

The MLA 770 includes a plurality of Tiles 780 and an on-chip memory system implemented on a semiconductor die. The Tiles are organized into one or more meshes of interconnected Tiles. A depiction of a Tile mesh is shown to the right of box 770 in FIG. 7B. In each mesh, the Tiles 780 are organized in a regular pattern and the interconnections within each mesh provide data transfer paths between Tiles in the mesh. The Tiles execute computations according to instructions received by the Tiles and using data stored in the on-chip memory system. These instructions may be for computations and/or for data transfer. Computations include multiply (including matrix multiply), add, and operators (e.g., nonlinear functions, lookup table, min/max, pooling). These are computations that implement the MLN. In the example of FIG. 7A, the computations performed by layers 702A-D are allocated to groups 782A-D of Tiles as indicated. The allocation is not required to be 1:1. For example, multiple layers could be allocated to a single Tile or vice versa. In some of the embodiments described above, the layers are computed one at a time, so that the current layer is allocated to the available Tiles and computed. Then the next layer is allocated to the available Tiles and computed. And so on. Not every computation required to implement an MLN need be executed by a Tile; some computation may be executed outside the MLA (e.g., floating point operations, if the Tiles only do integer arithmetic). Tiles typically will at least perform matrix multiplication.

The compiler 720 receives a description of the MLN 700 and generates a computer program 750 that implements the MLN using the MLA 770. The computer program 750 receives an input sample for the MLN and executes the operations of the MLN to produce the output for the MLN. The computer program 750 includes instructions to be executed by the Tiles for implementing computations in the MLN and may also include instructions to be executed by other elements, such as a controller outside the Tiles.

The compiler generates instructions to be executed by multiple Tiles according to a static schedule. For example, the statically scheduled instructions may include a series of computations required to implement a portion of the MLN, where the time required for each computation and associated data transfers is deterministic. As a result, the compiler may statically schedule these Tile instructions. The resulting computer program produced by the compiler then implements an allocation of instructions to Tiles and a schedule for executing the instructions as determined by the compiler, although these may not be expressly contained within the computer program.

Instructions for transferring data to or from the PEs may also be statically scheduled. In order to statically schedule the data transfer instructions, the compiler determines data transfer paths for the data transfers based on a topology of the data transfer paths between PEs, on dependencies of the instructions, on a duration for execution of the instructions, and on how other data transfers are utilizing the available data transfer paths. Because the compiler can determine these at compile-time rather than at run-time, it can ensure that the data transfer instructions are not conflicting (i.e., two instructions are not scheduled to use the same data transfer path at the same time). The statically scheduled data transfer instructions can be executed by the PEs without requiring hardware that implements hardware routing tables or congestion arbitration (e.g., queuing for managing contention and collision).

Not all instructions have to be statically scheduled. For example, data fetch or instruction fetch from off-chip memory where the time required to execute the operation varies too much to allow reliable synchronization with other operations may not be statically scheduled. Other examples include computations that occur off-chip, and conditions, branching and other programmatic constructs that depend on values not known until run-time.

FIG. 7B shows a static schedule computed by the compiler for executing Tile instructions. The static schedule begins at some time when all of the Tiles are synchronized, which for convenience is marked as cycle c0 in FIG. 7B. The Tiles may have circuitry that synchronizes the Tiles. For example, each Tile may monitor when it is ready to begin execution of statically scheduled instructions and then actual execution begins when all Tiles signal that they are ready. Alternatively, an external controller may synchronize the Tiles and start the static schedule when all Tiles are ready.

In this example, the instructions are executed by three Tiles, as denoted by T1, T2 and T3. Each Tile has two pipelines: a "D" pipeline for executing data transfer instructions and a "C" pipeline for executing compute instructions. The data transfer instructions can include instructions for Input-to-IFM, eXchange-Concat and Change-in-Splits, as described above. The row labeled T1 D shows instructions executed by the Tile 1 D (data transfer) pipeline, and the row labeled T1 C shows instructions executed by the Tile 1 C (compute) pipeline. For this example, assume that all the data transfer instructions are instructions that load new data into that Tile for consumption by the compute pipeline. The white regions of each row denote the execution of instructions and the hashed regions indicate that the pipeline is idling or executing a NO-OP (no operation).

For Tile 1, instruction 755a transfers data into Tile 1 and instruction 755b then performs a computation that consumes that data. Instruction 755b is dependent on instruction 755a. Here, the T1 C pipeline is not required to continuously poll the T1 D pipeline at run-time for when the data is available, and run-time message passing between the pipelines is not required to indicate that the data is available. Rather, because the duration (i.e., time required to execute) of instruction 755a is known, the compiler knows when the data will be available (for convenience, marked as cycle c1 in the figure) and can construct a static schedule in which instruction 755b starts execution then. The duration of instruction 755b is also known, so the compiler knows that compute instruction 755d may start after instruction 755b. In this case, the compiler determines a static schedule in which instruction 755d starts at cycle c3. Compute instruction 755d depends on data brought into the Tile by instruction 755c. The duration of instruction 755c is known, so the compiler knows that in the static schedule, instruction 755c must start at cycle c2 or earlier. This pattern is repeated for pairs of data transfer instructions and compute instructions 755e-f, 755g-h, 755i-j.

For Tile 2, compute instruction 755l depends on data from data transfer instruction 755k. However, instruction 755k does not start immediately at cycle c0. Rather, it has a delayed start at cycle c4. This may be because the data transfer path required by instruction 755k is occupied by some other data transfer instruction and is not available until cycle c4. The start time of instruction 755k in the static schedule is not determined by run-time arbitration or contention mechanisms for the shared data transfer path. Rather, the compiler knows that the data transfer path is occupied since the compiler knows the start times and durations of all the instructions, so the compiler simply creates a static schedule in which instruction 755k does not start until cycle c4 when the compiler knows the data transfer path will be available. Similarly, data transfer instruction 755m has a delayed start time. Perhaps the T2 D pipeline is being used to transfer out the results of computation 755l and does not become available until cycle c5.

For Tile 3, computation 755n starts immediately at cycle c0. Perhaps the required data was loaded into Tile 3 during some prior phase. Data transfer instructions 755o and 755p load data for compute instruction 755q. They are separated in time, perhaps because different pieces of data were not available or the data transfer paths were not available until those times. As a final example, data transfer instruction 755r loads data for compute instruction 755s. In the static schedule, the compiler places instruction 755r well in advance of when the data is required, but this may be because that is when the data transfer path is available or perhaps the data was transferred out of the sourcing Tile in order to make room in that Tile.

Execution of the instructions according to the static schedule at run-time may be implemented in different ways. In one approach, the computer program includes an express schedule for the execution of the instructions. Continuing the example of FIG. 7C, the computer program may specify that instruction 755a executes at cycle c0, instruction 755b at cycle c1, instruction 755c at cycle c2, etc. Alternatively, the compiler may fill each instruction stream with NO-OPs to achieve the correct timing. A NO-OP (no operation) is an instruction that occupies a certain number of cycles without other activity. For example, the compiler knows that instruction 755a will end at cycle c1 and instruction 755b is supposed to begin at cycle c1. It may fill the space between cycles c0 and c1 with NO-OPs for the T1 C pipeline. The T1 C pipeline then just continuously executes instructions from its queue, and the NO-OPs ensure that instruction 755b is executed according to the compiler's static schedule. In yet another approach, the static schedule may be implemented by hardware. The T1 C pipeline may just stall on the execution of instruction 755b until the data from instruction 755a is ready. The compiler knows that data will be ready at cycle c1 and, therefore, instruction 755b will execute starting at cycle c1 even though the Tiles are unaware of the static schedule. Regardless of the implementation, for convenience, all of these situations will be described using the phrase "static schedule." Thus, a statement that the compiler statically schedules the instructions is intended to include all of the above implementations and is not meant to imply that the computer program expressly includes a scheduled time for each instruction.

In order to statically schedule instructions, the compiler typically will know the duration of each instruction (i.e., how long each instruction takes to execute), the capabilities of each Tile (which Tiles can execute which instructions), the topology of data transfer paths to and from Tiles (including between Tiles, and between Tiles and on-chip memory), and the computations required and their dependencies (i.e., the MLN description). With this information, the compiler can schedule unconditional start times for the Tile instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided.

Figure 8A:
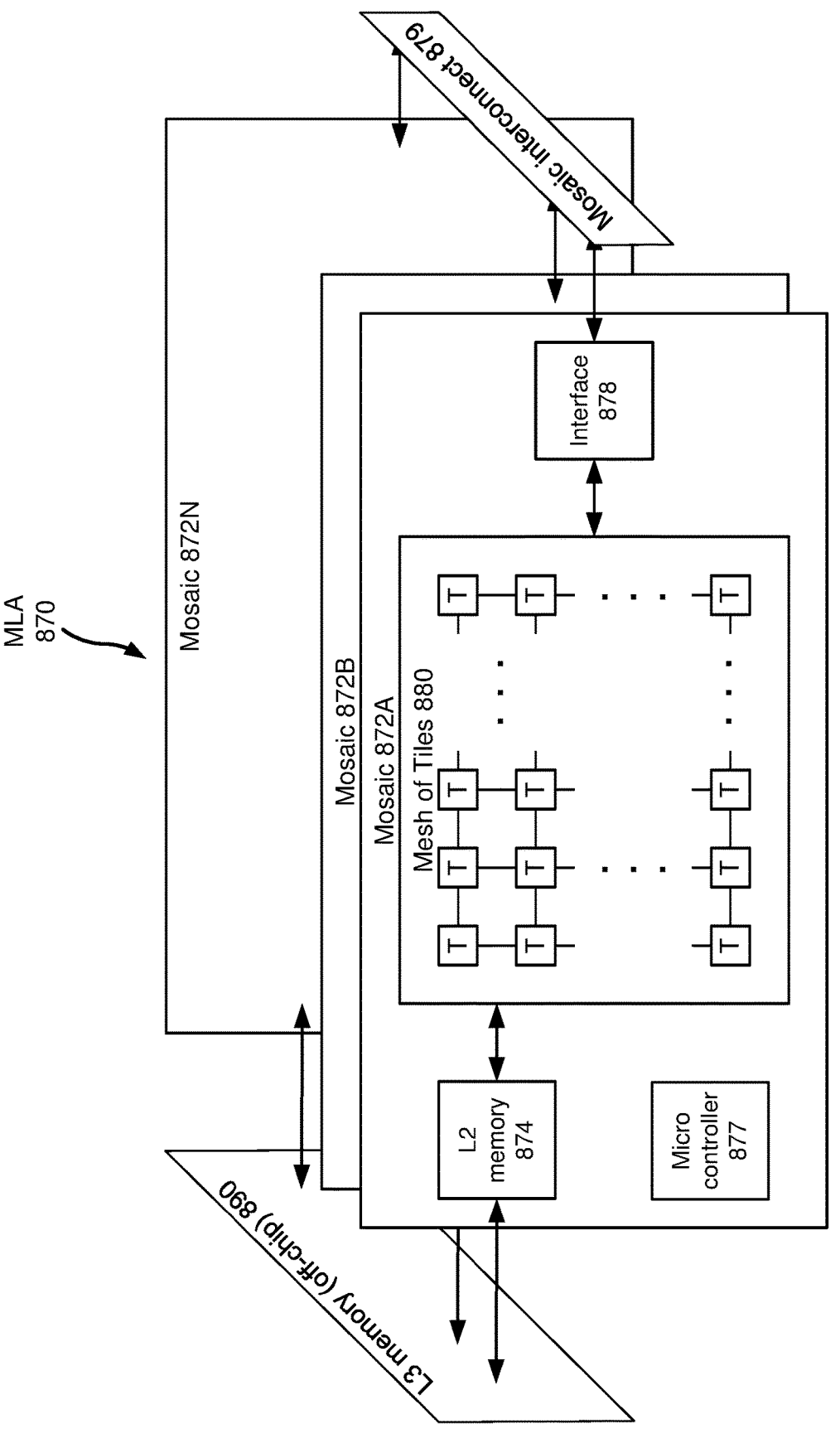
FIG. 8A is a block diagram of a hardware system including an MLA.
Figure 8B:
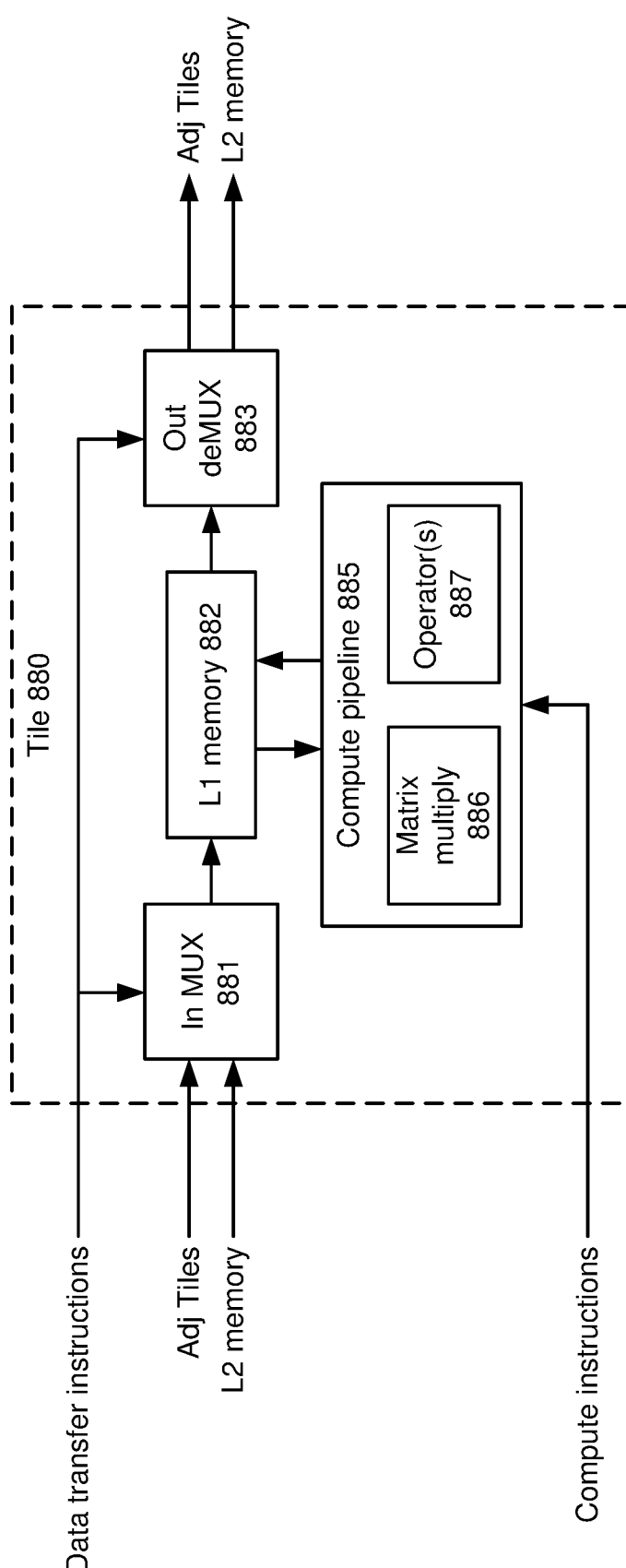
FIG. 8B is a block diagram of a Tile within an MLA.
Figure 8C:
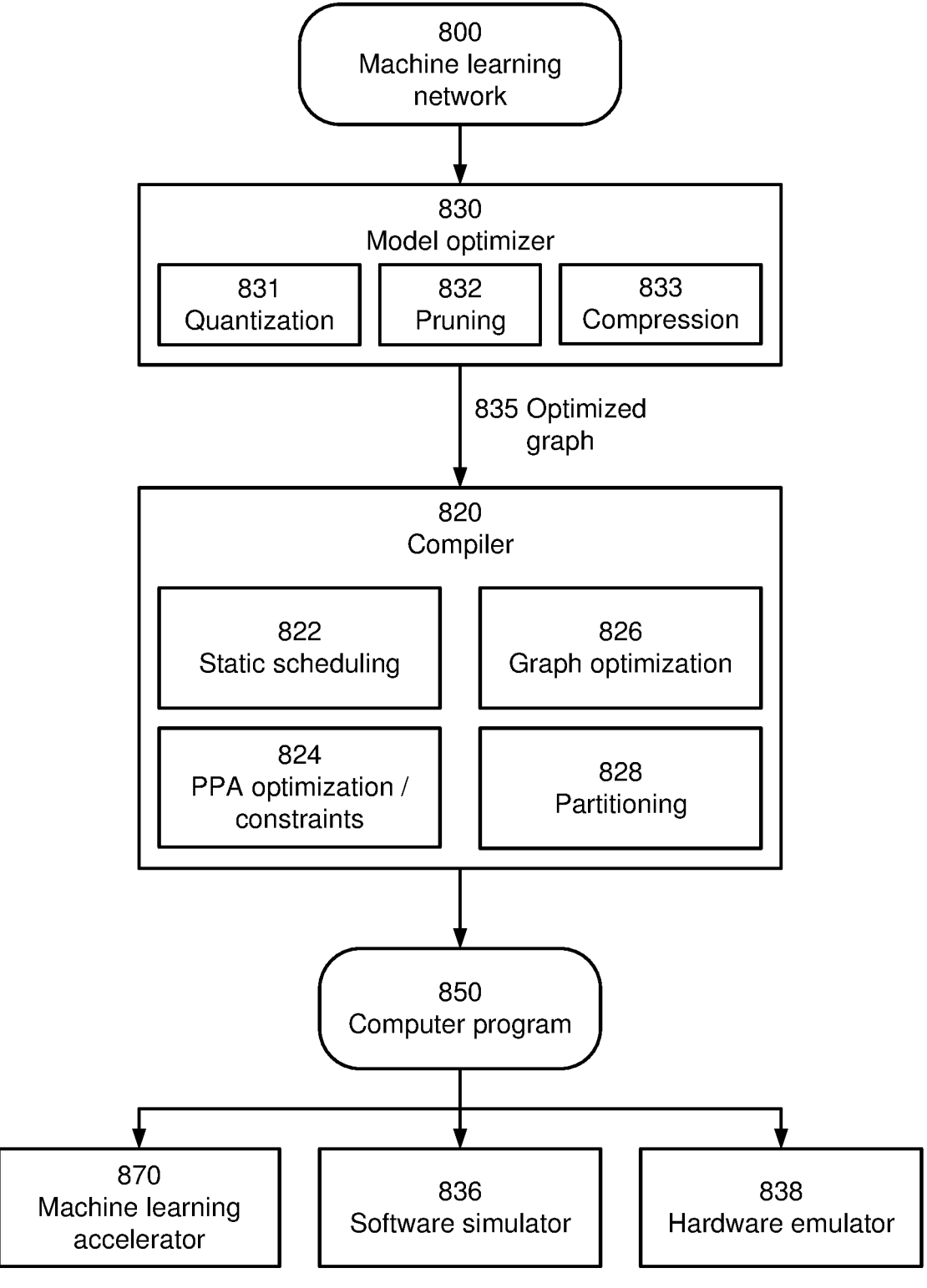
FIG. 8C is a block diagram of a software development environment including an MLN compiler.

FIGS. 8A-8C are more detailed descriptions of an example system that includes an MLA and corresponding compiler. FIG. 8A-8B show the hardware component and FIG. 8C shows the software development environment.

FIG. 8A is a block diagram of a hardware system including an MLA 870. The MLA 870 includes all the components shown in FIG. 8A, except the off-chip L3 memory 890. The MLA components are implemented on a single die as part of a single chip. The MLA 870 includes one or more mosaics 872A-N. In this example, all of the mosaics are the same. Each mosaic 872 includes a mesh of Tiles 880, an on-chip memory system and a controller 877. In FIG. 8A, the on-chip memory system is a multi-level memory system, which includes a level 1 (L1) memory distributed among the Tiles (see FIG. 8B) and a level 7 (L2) memory 874 shared by the Tiles. If there are multiple mosaics 872, the MLA 870 may include a dedicated interconnect 879 for connecting the different mosaics. Each mosaic also includes an interface 878 to the interconnect 879.

FIG. 8B is a block diagram of a Tile 880 within the MLA. In this example, all the Tiles are the same. Each Tile 880 includes an L1 memory 882. Each Tile 880 also includes a data transfer pipeline that executes instructions for transferring data to and from the L1 memory 882. Here, the Tiles 880 are arranged in a rectangular array as shown in FIG. 8A, with each Tile connected to its adjacent neighbors. Interior Tiles are connected to four adjacent Tiles. Edge Tiles are connected to adjacent Tiles and also to L2 memory 874. In FIG. 8B, the L1 memory 882 may receive data from any of its adjacent Tiles and/or from L2 memory if it is an edge Tile. Similarly, it may transfer data to any of its adjacent Tiles and/or to L2 memory if it is an edge Tile. The data transfer operations are controlled by data transfer instructions received and executed by the Tiles. In the examples described above, Input-to-IFM, eXchange-Concat and Change-in-Splits data transfers are accomplished by transferring data between L1 memories of the Tiles, without having to use L2 memory or off-chip L3 memory.

Each Tile 880 also includes a compute pipeline 885 for executing computations using data stored in the L1 memory 882. The L1 memory acts as software-configurable registers for the compute pipeline 885. The compute pipeline 885 includes matrix multiplication circuitry 886, such as a systolic array, and circuitry for implementing different types of operators 887. The computations are controlled by compute instructions received and executed by the Tiles.

In this particular example, all of the data transfer instructions and compute instructions executed by the Tiles are statically scheduled. These instructions include data transfer between L1 memories in different Tiles, and data transfer between L1 memory and L2 memory. Data transfer instructions may specify one hop at a time (e.g., transfer data to the east neighbor Tile) or may specify destination and path through intermediate Tiles (e.g., transfer data to Tile (5,5) using path east-east-north-north-east). The instructions also include matrix multiplies performed by the Tiles and operators applied by the Tiles. These operations do not require very many different instructions to implement, so the overall instruction set may be fairly small, for example not more than 20 instructions, or not more than 50 instructions.

The L3 memory 890 is off-chip. In this example, the L1 and L2 memories are implemented as on-chip SRAM and the L3 memory is implemented as DRAM (flash memory and SSD drives are other alternatives). Because the L1 and L2 memories are implemented as SRAM, the data transfers between L1 memories or between L1 and L2 memories have deterministic timing, so these data transfer instructions can be statically scheduled by the compiler. However, data transfer from off-chip DRAM is more unpredictable in timing. As a result, these instructions are non-deterministic in nature and they are executed by the microcontroller 877. Therefore, they are not statically scheduled.

In one approach, the instructions in the computer program and the data required for computation (e.g., input, weights, biases, parameters for operators) are initially loaded into L3 memory 880. From time to time, instructions and associated data are transferred from L3 memory into L1/L2 memory. Once these instructions and data are loaded into L1/L2 memory, the Tiles execute the loaded instructions according to a static schedule. Data may be continuously streamed into the L1/L2 memory, with the corresponding statically scheduled instructions consuming that data. In one approach, the Tiles execute only statically scheduled instructions, and all non-statically scheduled instructions are executed by processing elements outside the Tile mesh, for example, the microcontroller 877.

SRAM has predictable timing so implementing the L1 and L2 memories as SRAM allows the compiler to statically schedule data transfers from those memories into the Tiles for computation. However, there is a limit to the amount of SRAM that may be implemented on a die. In order to increase the effective size of SRAM, a virtual SRAM approach may be used. In one approach, the compute instructions that consume certain data are not fetched into the Tiles until after the corresponding data have been transferred from DRAM (L3 memory) to SRAM (L1/L2 memory). This guarantees that the compute instructions will not be executed by the Tiles before the data is available. All data effectively will appear as if it is transferred to the Tiles from SRAM for computation, even if all of the data would not fit into the available SRAM.

L2 memory may also be used to temporarily store interim values that are too voluminous to store in L1 memory. For example, a layer K of the MLN may produce a large amount of data at its output, to be used as input to the next layer K+1. The layer K output may be stored in L2 memory and then retrieved from L2 memory as needed for the next layer's computations.

FIG. 8C is a block diagram of a software development environment including an MLN compiler 820. In this example, the software development environment also includes a model optimizer 830. The model optimizer 830 receives a description of the MLN 800 and produces an optimized graph 835 of the MLN. It may apply optimizations such as quantization 831, pruning 832 and/or compression 833. Quantization 831 reduces the resolution of calculated values. For example, floating point values may be quantized to a certain number of bits and then integer math used instead of floating point math. This reduces the complexity and power consumed by the Tiles. Pruning 832 removes parts of the MLN that do not contribute significantly to the overall results. For example, if certain weights are zero or close to zero, those weighted interconnects may be pruned. Finally, because MLNs contain a large amount of data, compression may be used successfully to reduce data transfer bandwidths.

The resulting optimized description 835 of the MLN may be expressed as a graph, in which the nodes of the graph represent nodes in the MLN and the edges of the graph represent the weighted interconnects. The compiler 820 receives the optimized graph 835 and produces the resulting computer program 850. The compiler 820 may perform operations including static scheduling 822, PPA (power performance area) optimizations 824, graph optimizations 826 and/or partitioning 828. Static scheduling 822 of the appropriate instructions was described above.

PPA optimization 824 includes different optimizations of the computer program 850. For example, the allocation of MLN computations to Tiles may be optimized to reduce power consumption, to increase performance (such as reducing latency or increasing throughput) and/or to reduce area (e.g., number of Tiles used).

For a given graph representation of an MLN, the number of computations required to execute the MLN is fixed. As a result, in one approach, the compiler may optimize to increase the utilization of compute resources in the Tiles—to keep the compute pipelines as busy as possible. However, for a Tile to execute a computation, the data for that computation must be available. This means that any prior computations must be completed and that those results must be transferred to the Tile doing the next computation. Thus, rather than focusing on computations, the compiler may optimize with respect to data transfer to reduce the wait times of computations, as described above. It may also allocate computations to Tiles in order to reduce data transfers between Tiles in the same mesh, to reduce data transfers from outside the MLA and/or to reduce data transfers that cross the boundary of the mesh (e.g., reducing data transfers between L1 and L2 memory and trying to keep all data in L1 memory).

The compiler 820 may also optimize 824 the computer program 850, subject to constraints on power, performance, area and/or any of the quantities described above. Graph optimization 826 includes analysis of the graph representing the MLN to prune, merge or quantize links, parameters, values, and layers to achieve better performance. Partitioning 828 concerns mapping the computations in the MLN to an implementation on the MLA. This includes determining which computations are allocated to which Tiles and how data flows through the mesh of Tiles during computation. If there are multiple mosaics, it also includes determining which computations are allocated to which mosaics.

The resulting computer program 850 may be loaded into memory for execution on a machine learning accelerator 870. For example, one possible application is object detection. In this case, the inputs are images captured by a video camera. The MLN 800 has been trained to identify certain objects in the video images. The computer program 850 implementing the MLN is loaded onto memory that is accessible by the MLA 870, which is implemented as a chip inside the camera. This way, images captured by the video camera may be immediately analyzed by the computer program 850 running on the MLA 870.

In addition to the MLA 870, the computer program 850 or parts of it may be run on a software simulator 836 and/or hardware emulator 838 (including FPGAs configured as MLAs). These may be used for product development, debugging and/or prototyping.

The approach based on static scheduling described above is not restricted to the examples described above. For example, different network topologies of Tiles may be used. Other Tile meshes may also be statically scheduled, so long as the time required to execute computations and to transfer data between Tiles may be determined at compile time.

Figure 9:
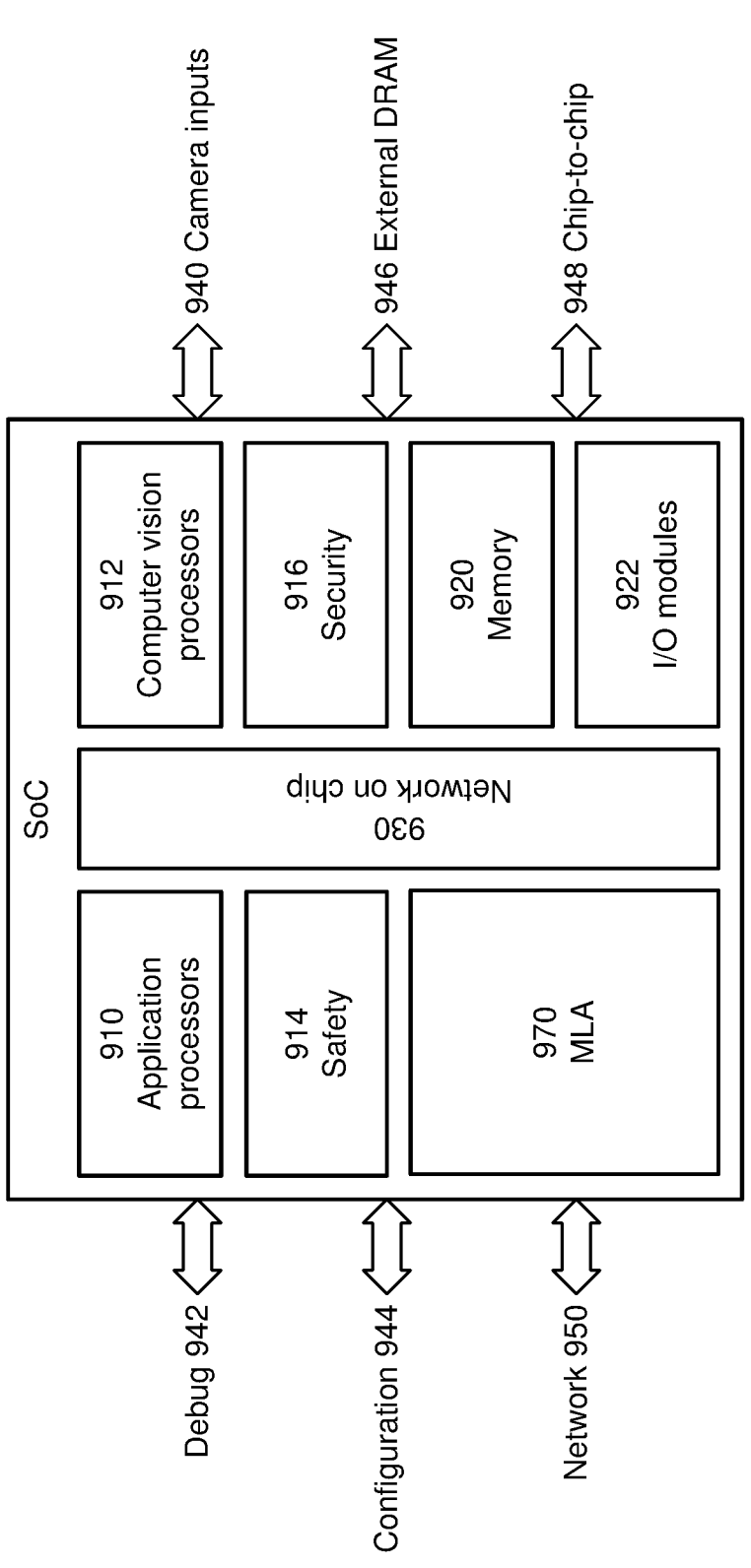
FIG. 9 is a block diagram of an integrated circuit product that includes an MLA.

FIG. 9 is a block diagram of an integrated circuit that includes an MLA 970. Other components may be included on the same die as the MLA. This example includes the following additional blocks: application processor 910 (e.g., general purpose CPU running applications), computer vision processor 912 (or other types of application-specific processors), safety 914, security 916, additional SRAM (memory) 920 and input/output circuitry 922. It also includes a network 930 for communication between the different components. This type of semiconductor chip may be referred to as a system-on-chip (SoC).

The connections to the external world include camera inputs 940 for the computer vision processors, ports for debug 942 and configuration 944, a connection 946 to external memory (e.g., DRAM), chip-to-chip connections 948, and network connections 950 (e.g., Ethernet and PCIe).

The SoC of FIG. 9 may be combined with other components to perform various tasks in edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time.

In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. For example, image samples may be input to the computer vision processors 912, which perform initial operations such as edge detection and enhancement, contrast enhancement, motion detection, and optical flow. Raw and/or processed images may be then input to the MLA 970 for analysis by the machine learning network. The MLA may also receive other inputs, such as metadata from other sources and data from other sensors. The application processors 910 may also perform various functions in the overall pipeline and may also serve as a master controller that coordinates operation of the MLA and the other programmable processors in the pipeline.

Edge devices may be portable with less power available for computations compared to, for example, cloud-based server farms. It may also be desirable for the computing pipeline within the edge device to perform tasks without utilizing cloud-based or other remote compute resources. In some implementations, the MLA implements computations in the machine learning network at a performance of at least 50 TOPs (50 trillion operations per second) at a power consumption of not more than 5 watts. The performance may be increased by increasing the number of Tiles in the mesh or the number of Tile meshes on the die.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method implemented on a computer system for compiling a machine learning network for execution on a plurality of interconnected processing elements, the method comprising:

estimating single-layer costs of executing individual layers of the machine learning network using different splits $(P_s,Q_s,K_s)$ of the individual layers; wherein inputs and outputs of individual layers are tensors with spatial dimensions (p,q) and channel dimension k, the splits partition the tensors into slices that are allocated to corresponding processing elements for execution, the splits for the inputs to individual layers are the splits of the outputs from previous layers, the same splits $(P_s,Q_s,K_s)$ are used for layers that have a same spatial size P×Q, and the single-layer costs include costs of data transfer between processing elements assuming that inputs and outputs of the individual layers have a same spatial split $(P_s,Q_s)$;

selecting candidate splits for different spatial sizes P×Q based on the estimated single-layer costs;

estimating inter-layer costs of executing the machine learning network using different combinations of the candidate splits for different spatial sizes, wherein the inter-layer costs include costs of data transfer between processing elements resulting from differences in the spatial splits for inputs and outputs of individual layers;

selecting from among the combinations of candidate splits based on the estimated inter-layer costs; and generating a computer program that allocates computations to the processing elements according to the selected combination of candidate splits.

2. The computer-implemented method of claim 1, wherein the single-layer costs include costs of data transfer between different spatial slices within a same channel slice.

3. The computer-implemented method of claim 1, wherein the single-layer costs include costs of data transfer between different channel slices within a same spatial slice.

4. The computer-implemented method of claim 3, wherein the single-layer costs include costs of data duplication to all channel slices within the same spatial slice.

5. The computer-implemented method of claim 1, wherein selecting from among the combinations of candidate splits comprises multiple iterations evaluating different combinations, and the iterations are based on reducing the costs of data transfer between processing elements resulting from differences in the spatial splits for inputs and outputs of individual layers.

6. The computer-implemented method of claim 1, wherein selecting from among the combinations of candidate splits comprises multiple iterations evaluating different combinations, and the iterations are based on reducing a number of occurrences where adjacent layers have different spatial splits.

7. The computer-implemented method of claim 1, wherein the single-layer and inter-layer costs include timing costs and power costs.

8. The computer-implemented method of claim 1, wherein the processing elements have associated local memories, and the single-layer and inter-layer data transfer costs include the costs for data transfer only between the local memories of the processing elements.

9. The computer-implemented method of claim 1, wherein the single-layer costs further include costs for computations performed by the processing elements.

10. The computer-implemented method of claim 9, wherein each processing element is configured to perform a matrix multiply of a predefined size, and the costs for computations include timing costs based on a number of matrix multiplies of that predefined size performed by each processing element for given splits of the individual layers.

11. The computer-implemented method of claim 1, wherein the single-layer and inter-layer costs are estimated based on models.

12. The computer-implemented method of claim 1, wherein the single-layer and inter-layer costs are estimated based on simulations.

13. The computer-implemented method of claim 1, wherein selecting from among the combinations of candidate splits comprises multiple iterations evaluating different combinations of candidate splits for sets of different spatial sizes, and a number of different spatial sizes in the sets increases as the iterations progress.

14. The computer-implemented method of claim 1, wherein the computer program includes instructions for data transfers between processing elements and for computations executed by processing elements, and the instructions are statically scheduled at compile-time.

15. A system for compiling a machine learning network for execution on a plurality of interconnected processing elements, the system comprising a memory storing instructions; and a processing device coupled with the memory and to execute the instructions, wherein the instructions when executed cause the processing device to implement:

an autosplit engine configured to select splits $(P_s,Q_s,K_s)$ for individual layers of the machine learning network based on (a) costs of data transfer between processing elements assuming that inputs and outputs of individual layers have a same spatial split $(P_s,Q_s)$, and (b) costs of data transfer between processing elements resulting from differences in the spatial splits for inputs and outputs of individual layers; and further to select the same splits $(P_s,Q_s,K_s)$ for layers that have a same spatial size P×Q; and a compiler configured to generate a computer program that allocates computations for executing the machine learning network to the processing elements according to the selected splits for the individual layers; wherein the computer program includes instructions for the data transfers between processing elements and for computations executed by processing elements, and the compiler statically schedules the instructions.

16. The system of claim 15, wherein the computer program executes the individual layers sequentially.

17. The system of claim 15, wherein the inputs and outputs of individual layers are tensors with spatial dimensions (p,q) and channel dimension k; the splits partition the tensors into slices; and the compiler is further configured to allocate computations for the slices to corresponding processing elements for execution.

18. The system of claim 17, wherein different spatial slices within a same channel slice are allocated to adjacent processing elements.

19. The system of claim 18, wherein contiguous processing elements for different channel slices have a same layout shape.

20. The system of claim 15, further comprising:

pre-computed tabulations that map different splits ($P_s$,$Q_s$, $K_s$) to processing elements;

wherein the compiler allocates computations to the processing elements based on lookup tables.

* * * * *